(12) United States Patent
Gottlieb

(10) Patent No.: US 9,712,579 B2
(45) Date of Patent: Jul. 18, 2017

(54) SYSTEMS AND METHODS FOR CREATING AND PUBLISHING CUSTOMIZABLE IMAGES FROM WITHIN ONLINE EVENTS

(71) Applicant: SHINDIG, Inc., New York, NY (US)

(72) Inventor: Steven M. Gottlieb, New York, NY (US)

(73) Assignee: Shindig. Inc., New York, NY (US)

( * ) Notice: Subject to any disclaimer, the term of this patent is extended or adjusted under 35 U.S.C. 154(b) by 0 days.

(21) Appl. No.: 14/810,307

(22) Filed: Jul. 27, 2015

(65) Prior Publication Data

US 2015/0334142 A1 Nov. 19, 2015

Related U.S. Application Data

(63) Continuation-in-part of application No. 12/752,332, filed on Apr. 1, 2010, now Pat. No. 9,344,745.

(Continued)

(51) Int. Cl.
*H04N 5/76* (2006.01)
*H04L 29/06* (2006.01)
(Continued)

(52) U.S. Cl.
CPC .......... *H04L 65/403* (2013.01); *G06F 3/0482* (2013.01); *G06F 3/04842* (2013.01); *G06F 3/04845* (2013.01); *H04N 7/15* (2013.01); *H04N 21/4117* (2013.01); *H04N 21/4223* (2013.01); *H04N 21/42203* (2013.01); *H04N 21/4788* (2013.01); *H04N 21/47205* (2013.01); *H04N 21/8153* (2013.01)

(58) Field of Classification Search
None
See application file for complete search history.

(56) References Cited

U.S. PATENT DOCUMENTS 6,044,146 A 3/2000 Gisby et al.
6,241,612 B1 6/2001 Heredia
(Continued)

FOREIGN PATENT DOCUMENTS

CA 2771785 A 3/2011
CA 2774014 A 4/2011
(Continued)

OTHER PUBLICATIONS

About TokBox, Inc., All about TokBox, http://www.tokbox.com/about, retrieved Feb. 4, 2011, p. 1.
(Continued)

*Primary Examiner* — Eileen Adams
(74) *Attorney, Agent, or Firm* — Robert W. Morris; Eckert Seamans Cherin & Mellott, LLC

(57) ABSTRACT

Systems, methods, and non-transitory computer readable media creating and publishing customizable images from within online events are provided. A user may capture an image from an online event presented within a user interface. In response to capturing the image, a pop-up window may be displayed within the presented online event on the user interface. In some embodiments, the pop-up window may include one or more options for customizing or modifying a background of the capture image, as well as including one or more sharing options to publish the captured image.

23 Claims, 15 Drawing Sheets

Related U.S. Application Data

(60) Provisional application No. 61/165,797, filed on Apr. 1, 2009, provisional application No. 62/028,998, filed on Jul. 25, 2014.

(51) Int. Cl.

| | |
|---|---|
| *G06F 3/0482* | (2013.01) |
| *G06F 3/0484* | (2013.01) |
| *H04N 7/15* | (2006.01) |
| *H04N 21/41* | (2011.01) |
| *H04N 21/422* | (2011.01) |
| *H04N 21/4223* | (2011.01) |
| *H04N 21/472* | (2011.01) |
| *H04N 21/4788* | (2011.01) |
| *H04N 21/81* | (2011.01) |

(56) References Cited

U.S. PATENT DOCUMENTS

| | | |
|---|---|---|
| 6,259,471 B1 | 7/2001 | Peters et al. |
| 6,559,863 B1 | 5/2003 | Megiddo |
| 6,654,346 B1 | 11/2003 | Mahalingaiah et al. |
| 6,697,614 B2 | 2/2004 | Dorenbosch |
| 7,478,129 B1 | 1/2009 | Chemtob |
| 7,487,211 B2 | 2/2009 | Beavers et al. |
| 7,495,687 B2 | 2/2009 | DuMas et al. |
| 7,515,560 B2 | 4/2009 | DuMas et al. |
| 7,593,032 B2 | 9/2009 | Civanlar et al. |
| 7,958,457 B1 | 6/2011 | Brandenberg et al. |
| 8,060,560 B2 | 11/2011 | Vonog et al. |
| 8,144,187 B2 | 3/2012 | Moore et al. |
| 8,171,154 B2 | 5/2012 | Vonog et al. |
| 8,225,127 B2 | 7/2012 | Vonog et al. |
| 8,390,670 B1 | 3/2013 | Gottlieb |
| 8,405,702 B1 | 3/2013 | Gottlieb |
| 8,429,704 B2 | 4/2013 | Vonog et al. |
| 8,458,328 B2 | 6/2013 | Dubovik et al. |
| 8,463,677 B2 | 6/2013 | Vonog et al. |
| 8,527,654 B2 | 9/2013 | Vonog et al. |
| 8,549,167 B2 | 10/2013 | Vonog et al. |
| 8,647,206 B1 | 2/2014 | Gottlieb |
| 8,779,265 B1 | 7/2014 | Gottlieb |
| 8,902,272 B1 | 12/2014 | Gottlieb |
| 8,929,516 B2 | 1/2015 | Odinak |
| 9,124,760 B2 | 9/2015 | Gottlieb |
| 9,215,412 B2 | 12/2015 | Gottlieb |
| 2002/0094831 A1 | 7/2002 | Maggenti et al. |
| 2002/0165921 A1 | 11/2002 | Sapieyevski |
| 2002/0169014 A1 | 11/2002 | Egozy et al. |
| 2003/0000369 A1 | 1/2003 | Funaki |
| 2003/0014262 A1 | 1/2003 | Kim |
| 2003/0164084 A1 | 9/2003 | Redmann et al. |
| 2004/0022202 A1 | 2/2004 | Yang et al. |
| 2005/0032539 A1 | 2/2005 | Noel et al. |
| 2005/0078613 A1 | 4/2005 | Covell et al. |
| 2005/0132288 A1 | 6/2005 | Kirn et al. |
| 2005/0143135 A1 | 6/2005 | Brems et al. |
| 2005/0262542 A1 | 11/2005 | DeWeese et al. |
| 2006/0055771 A1 | 3/2006 | Kies |
| 2006/0063555 A1 | 3/2006 | Robbins |
| 2006/0112814 A1 | 6/2006 | Paepcke |
| 2006/0114314 A1 | 6/2006 | Dunko |
| 2006/0140138 A1 | 6/2006 | Hill |
| 2007/0039449 A1 | 2/2007 | Redmann |
| 2007/0140510 A1 | 6/2007 | Redmann |
| 2007/0255816 A1 | 11/2007 | Quackenbush et al. |
| 2007/0265074 A1 | 11/2007 | Akahori et al. |
| 2008/0002668 A1 | 1/2008 | Asokan et al. |
| 2008/0037763 A1 | 2/2008 | Shaffer et al. |
| 2008/0136898 A1 | 6/2008 | Eisenberg et al. |
| 2008/0137559 A1 | 6/2008 | Sasaki et al. |
| 2008/0181260 A1 | 7/2008 | Vonog et al. |
| 2008/0190271 A1 | 8/2008 | Taub et al. |
| 2008/0232248 A1 | 9/2008 | Barave et al. |
| 2008/0274810 A1 | 11/2008 | Hayashi et al. |
| 2009/0033737 A1 | 2/2009 | Goose et al. |
| 2009/0040289 A1 | 2/2009 | Hetherington et al. |
| 2009/0054107 A1 | 2/2009 | Feland, III et al. |
| 2009/0070420 A1 | 3/2009 | Quackenbush |
| 2009/0172200 A1 | 7/2009 | Morrison et al. |
| 2009/0186605 A1 | 7/2009 | Apfel et al. |
| 2009/0209339 A1 | 8/2009 | Okada |
| 2009/0249244 A1 | 10/2009 | Robinson et al. |
| 2010/0005411 A1* | 1/2010 | Duncker ............ G06F 17/30873 715/769 |
| 2010/0030578 A1* | 2/2010 | Siddique ............ G06Q 10/0637 705/3 |
| 2010/0122184 A1 | 5/2010 | Vonog et al. |
| 2010/0165904 A1 | 7/2010 | Woodward et al. |
| 2010/0198992 A1 | 8/2010 | Morrison et al. |
| 2010/0316232 A1 | 12/2010 | Acero et al. |
| 2011/0011244 A1 | 1/2011 | Homburg |
| 2011/0011246 A1 | 1/2011 | Buskies et al. |
| 2011/0055317 A1 | 3/2011 | Vonog et al. |
| 2011/0078532 A1 | 3/2011 | Vonog et al. |
| 2011/0179180 A1 | 7/2011 | Schleifer et al. |
| 2011/0258474 A1 | 10/2011 | Vonog et al. |
| 2012/0038550 A1 | 2/2012 | Lemmey et al. |
| 2012/0039382 A1 | 2/2012 | Vonog et al. |
| 2012/0041859 A1 | 2/2012 | Vonog et al. |
| 2012/0060101 A1 | 3/2012 | Vonog et al. |
| 2012/0084456 A1 | 4/2012 | Vonog et al. |
| 2012/0084672 A1 | 4/2012 | Vonog et al. |
| 2012/0110162 A1 | 5/2012 | Dubovik et al. |
| 2012/0110163 A1 | 5/2012 | Dubovik et al. |
| 2012/0124128 A1 | 5/2012 | Vonog et al. |
| 2012/0127183 A1 | 5/2012 | Vonog et al. |
| 2012/0151541 A1 | 6/2012 | Vonog et al. |
| 2012/0192087 A1 | 7/2012 | Lemmey |
| 2012/0198334 A1 | 8/2012 | Surin et al. |
| 2012/0246227 A1 | 9/2012 | Vonog et al. |
| 2012/0249719 A1 | 10/2012 | Lemmy et al. |
| 2012/0254649 A1 | 10/2012 | Vonog et al. |
| 2012/0272162 A1 | 10/2012 | Surin et al. |
| 2012/0280905 A1 | 11/2012 | Vonog et al. |
| 2012/0293600 A1 | 11/2012 | Lemmy et al. |
| 2012/0297320 A1 | 11/2012 | Lemmy et al. |
| 2012/0326866 A1 | 12/2012 | Lemmey et al. |
| 2012/0331089 A1 | 12/2012 | Vonog et al. |
| 2012/0331387 A1 | 12/2012 | Lemmey et al. |
| 2013/0014027 A1 | 1/2013 | Lemmey |
| 2013/0014028 A1 | 1/2013 | Lemmey et al. |
| 2013/0019184 A1 | 1/2013 | Vonog et al. |
| 2013/0021431 A1 | 1/2013 | Lemmey et al. |
| 2013/0088518 A1 | 4/2013 | Lemmy et al. |
| 2013/0109302 A1 | 5/2013 | Levien et al. |
| 2013/0121503 A1 | 5/2013 | Ankolekar et al. |
| 2013/0156093 A1 | 6/2013 | Vonog et al. |
| 2013/0191479 A1 | 7/2013 | Gottlieb |
| 2014/0033900 A1 | 2/2014 | Chapman et al. |
| 2014/0229866 A1 | 8/2014 | Gottlieb |
| 2015/0054911 A1 | 2/2015 | Gottlieb |
| 2015/0106227 A1 | 4/2015 | Gottlieb |
| 2015/0116448 A1 | 4/2015 | Gottlieb |
| 2015/0301694 A1 | 10/2015 | Gottlieb |
| 2015/0301720 A1 | 10/2015 | Gottlieb |
| 2015/0304376 A1 | 10/2015 | Gottlieb |
| 2015/0304608 A1 | 10/2015 | Gottlieb |
| 2015/0326458 A1 | 11/2015 | Gottlieb |
| 2015/0328545 A1 | 11/2015 | Gottlieb |
| 2015/0334142 A1 | 11/2015 | Gottlieb |

FOREIGN PATENT DOCUMENTS

| | | |
|---|---|---|
| EP | 0721726 A | 12/2000 |
| EP | 2471221 A | 7/2012 |
| EP | 2484091 A | 8/2012 |
| EP | 2630630 A | 8/2013 |
| EP | 2636194 A | 9/2013 |
| GB | 2446529 A | 8/2008 |
| WO | 2009077936 A | 6/2009 |
| WO | 2011025989 A | 3/2011 |
| WO | 2011041229 A | 4/2011 |

(56) References Cited

FOREIGN PATENT DOCUMENTS

| | | |
|---|---|---|
| WO | 2012021173 A | 2/2012 |
| WO | 2012021174 A | 2/2012 |
| WO | 2012021901 A | 2/2012 |
| WO | 2012054089 A | 4/2012 |
| WO | 2012054895 A | 4/2012 |
| WO | 2012060977 A | 5/2012 |
| WO | 2012060978 A | 5/2012 |
| WO | 2012103376 A | 8/2012 |
| WO | 2012135384 A | 10/2012 |
| WO | 2012151471 A | 11/2012 |
| WO | 2012177641 A | 12/2012 |
| WO | 2012177779 A | 12/2012 |
| WO | 2013149079 A | 10/2013 |

OTHER PUBLICATIONS

CrunchBase Profile, CrunchBase readeo, http://www.crunchbase.com/company/readeo, retrieved Feb. 3, 2011, pp. 1-2.
CrunchBase Profile, CrunchBase Rounds, http://www.crunchbase.com/company/6rounds, retrieved Feb. 4, 2011, pp. 1-2.
CrunchBase Profile, CrunchBase TokBox, http://www.crunchbase.com/company/tokbox, retrieved Feb. 4, 2011, pp. 1-3.
Online Collaboration GoToMeeting, http://www.gotomeeting.com/fec/online_collaboration, retrieved Feb. 4, 2011, pp. 1-4.
Readeo Press Release, www.mmpublicity.com, Feb. 25, 2010, pp. 1-2.
Rounds.com, Make friends online and enjoy free webcam chats, http://www.rounds.com/about, retrieved Feb. 4, 2011, pp. 1-3.

\* cited by examiner

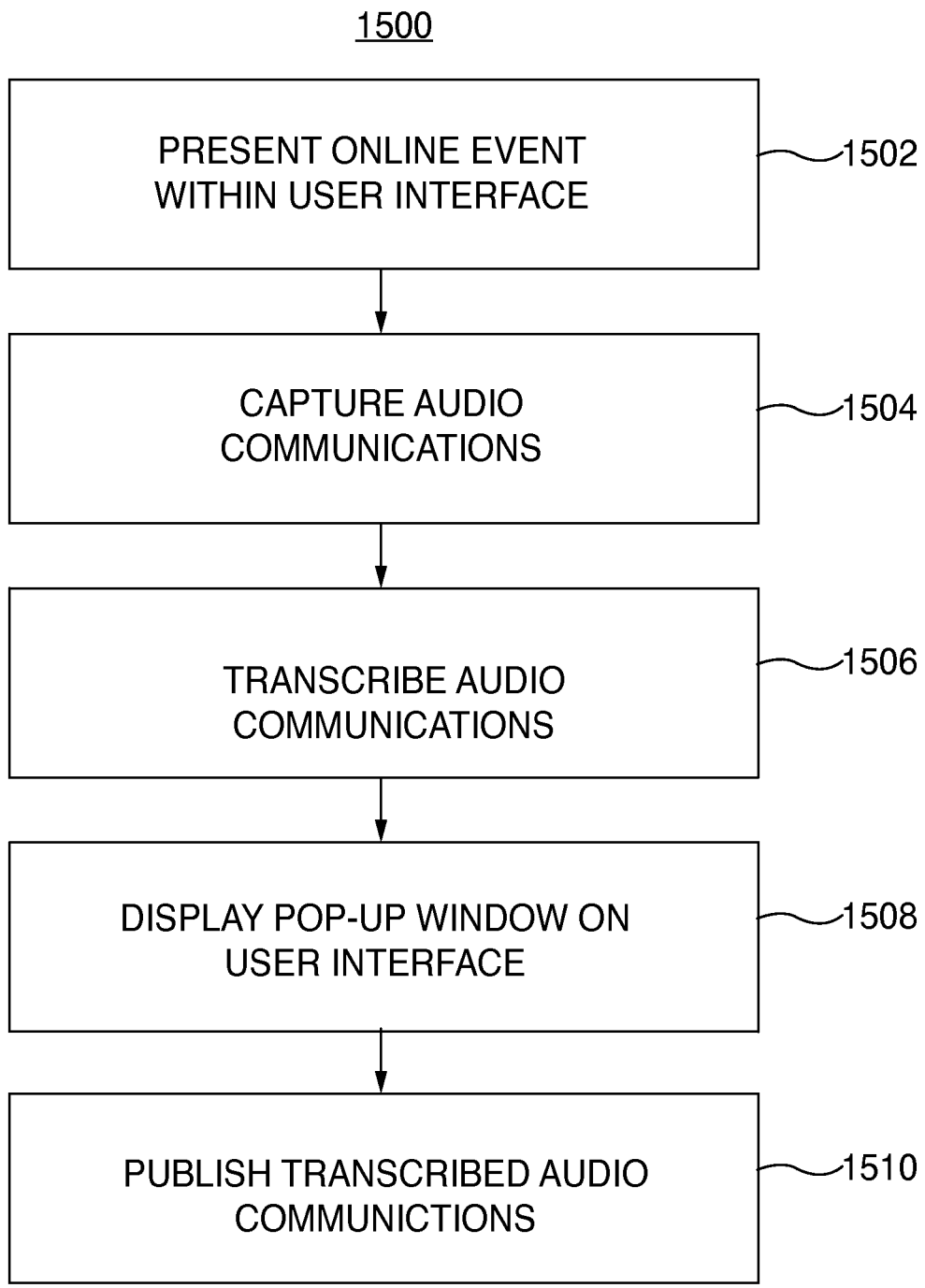

SYSTEMS AND METHODS FOR CREATING AND PUBLISHING CUSTOMIZABLE IMAGES FROM WITHIN ONLINE EVENTS

CROSS-REFERENCE TO RELATED APPLICATIONS

This application is a Continuation-In-Part of U.S. patent application Ser. No. 12/752,332, filed on Apr. 1, 2010, which claims the benefit of U.S. Provisional Application No. 61/165,797, filed Apr. 1, 2009, the disclosures of which are incorporated herein by reference in their entirety. This application also claims the benefit of U.S. Provisional Patent Application No. 62/028,998, filed Jul. 25, 2014, the disclosure of which is incorporated herein by reference in its entirety.

FIELD OF THE INVENTION

This disclosure generally relates to systems and methods for creating and publishing customizable images from within online events.

BACKGROUND OF THE INVENTION

Some traditional communications systems allow users to communicate using video chat, but such systems provide inadequate options for users to memorialize their interactions. For example, a traditional communications system may allow a user to save a video chat as one or more video files that include the feeds from each, but that medium is difficult for a user to transfer to paper or display to others. Moreover, such video files are inherently different from the group photographs that may be used to memorialize real-life gatherings.

Memorializing real-life gatherings, such as online events, or conversations, typically can be cumbersome processes. A user may have to perform intricate key-strokes or "snip" out an area of a display screen that the user wants to memorialize. This process may be further complicated by the extra steps needed to augment these now captured event images' backgrounds and to share the augmented or modified images. Thus, it would be beneficial for there to be systems and methods that allow users to easily and effectively capture and customize images from within online events for publication and sharing.

SUMMARY OF THE INVENTION

Systems and methods for publishing images from an online event are described herein. Online events, such as educational classes, conferences, meetings, or chats, often provide memorable moments or situations that a user may desire to capture and share. A user may be presented with one or more options to capture an image within an online event including one or more online participants. In response to selecting the one or more options, an image may be captured and displayed within a pop-up window within the presented online event.

The pop-up window may include one or more sharing options (e.g., via one or more social media networks, email, SMS message, instant message, etc.) as well as one or more background options for the image. In some embodiments, the pop-up window may include one or more background options that the user may select to modify the captured image's background. For example, the background may be selected to include a logo or insignia, a picture, or a predefined background image, or an image or graphic representation of the online event itself.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 15 is a flowchart of an illustrative process for publishing transcribed audio communications in accordance with various embodiments.

DETAILED DESCRIPTION OF THE INVENTION

In some embodiments, a communications system may facilitate communications between users. Communications system 100 may include at least one server 110. Server 110 can be any suitable server for facilitating communications between two or more users. For example, server 110 may include several interconnected computers running software to control communications.

Communications system 100 may include several user devices 121-124. Server 110 may be coupled with user devices 121-124 through any suitable network. For example, server 110 may be coupled with user devices 121-124 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, Bit-Torrent, FTP, RTP, RTSP, SSH, Voice over IP (VOIP), any other communications protocol, or any combination thereof. Each of user devices 121-124 may include an electronic device (e.g., a personal computer or a personal communications system). In some embodiments, each user device may correspond to a single user. For example, user device 121 may correspond to a first user and user device 122 may correspond to a second user. Server 110 may control communications between two or more of the user devices. For example, server 110 may control one-to-one communications between user device 121 and 122 and/or multi-party communications between user device 121 and user devices 122-124. Each user device may provide outputs to a user and receive inputs from the user when facilitating communications. For example, a user device may include one or more output interfaces (e.g., display screen or audio output) for providing communication outputs to a user and one or more input interfaces (e.g., a controller, joystick, keyboard, or mouse) for receiving communication inputs from a user.

Figure 1:
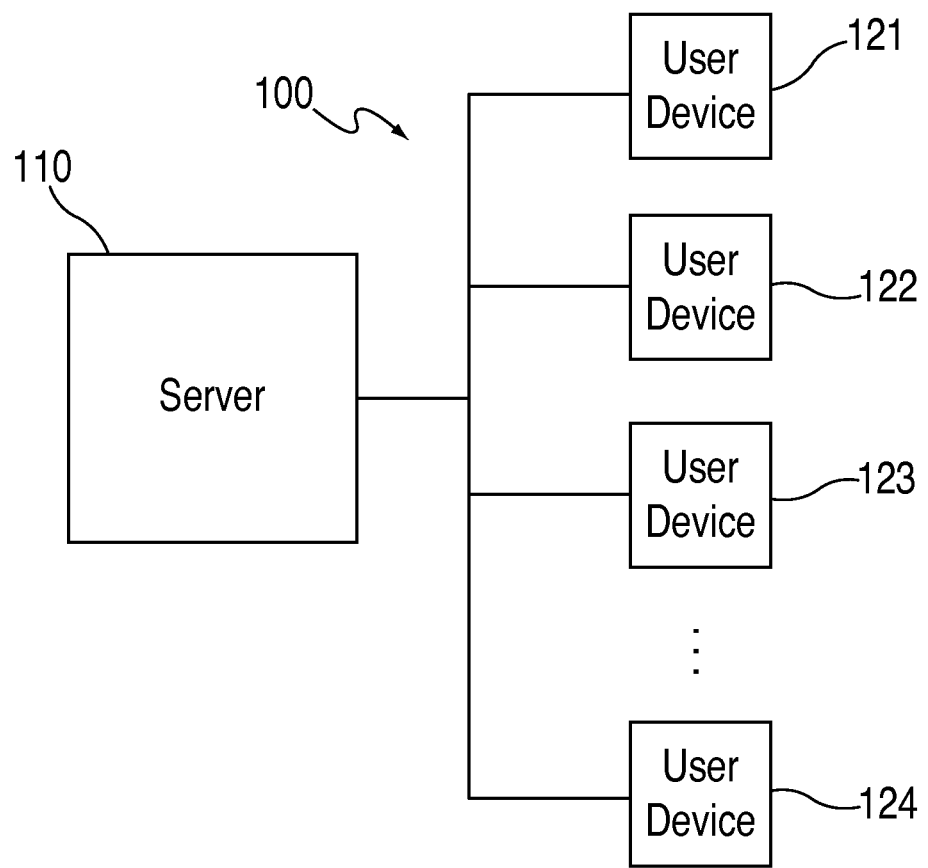
FIG. 1 is a schematic view of an illustrative communications system in accordance with various embodiments.

While only one server and four user devices (e.g., devices 121-124) are shown in FIG. 1, it is understood that any number of servers and user devices can be provided in a communications system. A more detailed description of suitable communications systems for facilitating user communications can be found in U.S. patent application Ser. No. 12/624,829, which is now U.S. Pat. No. 8,405,702, both of which have been incorporated herein by reference in their entirety.

While the previous discussion can be applied to systems for creating group portraits when the individual users are located remotely from each other, it is understood that this disclosure can also be applied to embodiments for creating group portraits when the individual users are congregated in one location. For example, a single user device can be used to sequentially capture an individual image of each user, and those images can be used to compose a group portrait in accordance with the disclosure. More specifically, a single user device may be provided that can capture an image of each individual user and then add that image to a group portrait. Accordingly, a new image may be added to the group portrait every time that a new user interacts with the user device.

In accordance with the present disclosure, a communications system may generate group portraits that include images of various users. For example, a communications system may generate a group portrait by combining a background image with images of each user in a communications group. The communications system may allow one or more of the users in a communications group to control the creation of the group portrait. For example, each user in the communications group may be able to adjust her image and/or specify where that image is located in the group portrait. In some embodiments, a communications system may display a group portrait creation screen to allow one or more users to control the creation of the group portrait.

Figure 2:
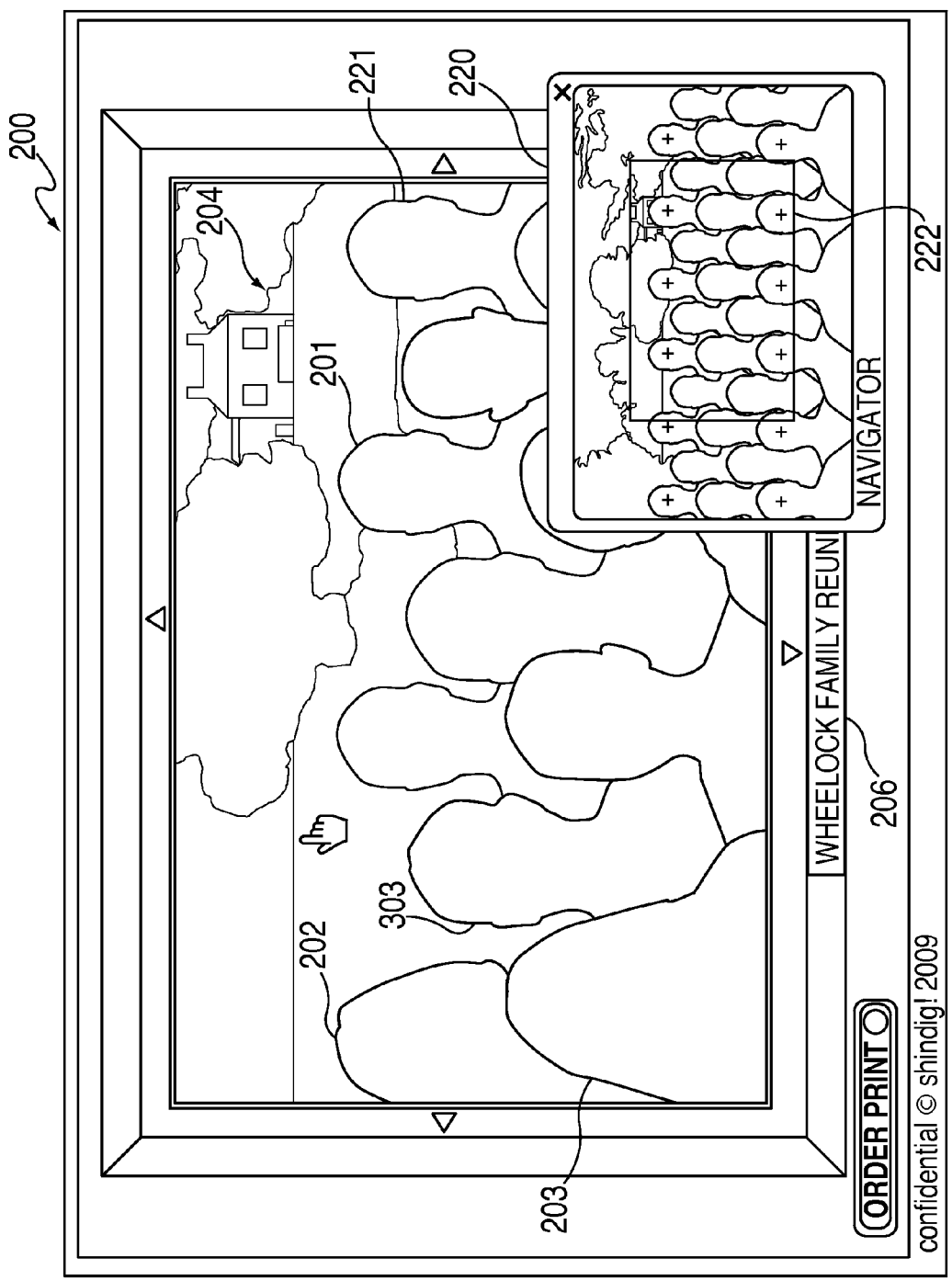
FIG. 2 is a schematic view of an illustrative group portrait creation screen in accordance with various embodiments.

FIG. 2 includes screen 200 for creating a group portrait in accordance with one embodiment of the invention. A communications system may provide screen 200 through one or more user devices (e.g., user devices 121-124 in system 100). The one or more user devices displaying screen 200 may receive user inputs related to screen 200 through one or more input devices (e.g., a touch screen display or computer mouse).

A user device may display screen 200 before any users have added their images to a group portrait. In other words, screen 200 may serve as the starting point for the group portrait. Screen 200 can include one or more silhouettes (e.g., silhouettes 201-203) denoting suitable locations for user images. The number of user image locations displayed on screen 200 may be based on the number of users that will be in the group portrait. For example, the number of user image locations may be based on the number of users in a communications group so that every user can be included in the group portrait. In another example, the number of user image locations may be based on a number that a user has manually specified.

The user image locations may be arranged so that each location does not substantially interfere with other locations. For example, each location may include a region for a user's face, and the locations may be arranged so that those regions do not overlap. Moreover, the user image locations may be assigned to different layers so that some user images will be displayed in front of other user images if the two user images overlap. For example, silhouette 203 may represent a user image location with a higher layer than silhouette 202. Accordingly, a user image that replaces silhouette 203 may be displayed in front of a user image that replaces silhouette 202.

Screen 200 may also include other indicia that will be part of the group portrait. In some embodiments, screen 200 may include background image 204. Background image 204 may be automatically chosen by a communications system, or manually selected by a user. For example, a user may manually select an image that is relevant to the group of users, and that selected image may be used as background image 204. In some embodiments, screen 200 may include title 206. Title 206 may be automatically chosen by a communications system or may be manually selected by a user.

Screen 200 can include navigator 220 for previewing and accessing different portions of a group portrait. For example, navigator 220 may display an entire group portrait and primary window 221 may only display a portion of a group portrait. In some embodiments, a user may be able to change the zoom of primary window 221 to change the size of the portion displayed in primary window 221. Navigator 220 can include indicator 222 to represent the portion of the group portrait that is displayed in primary window 221.

Figure 3:
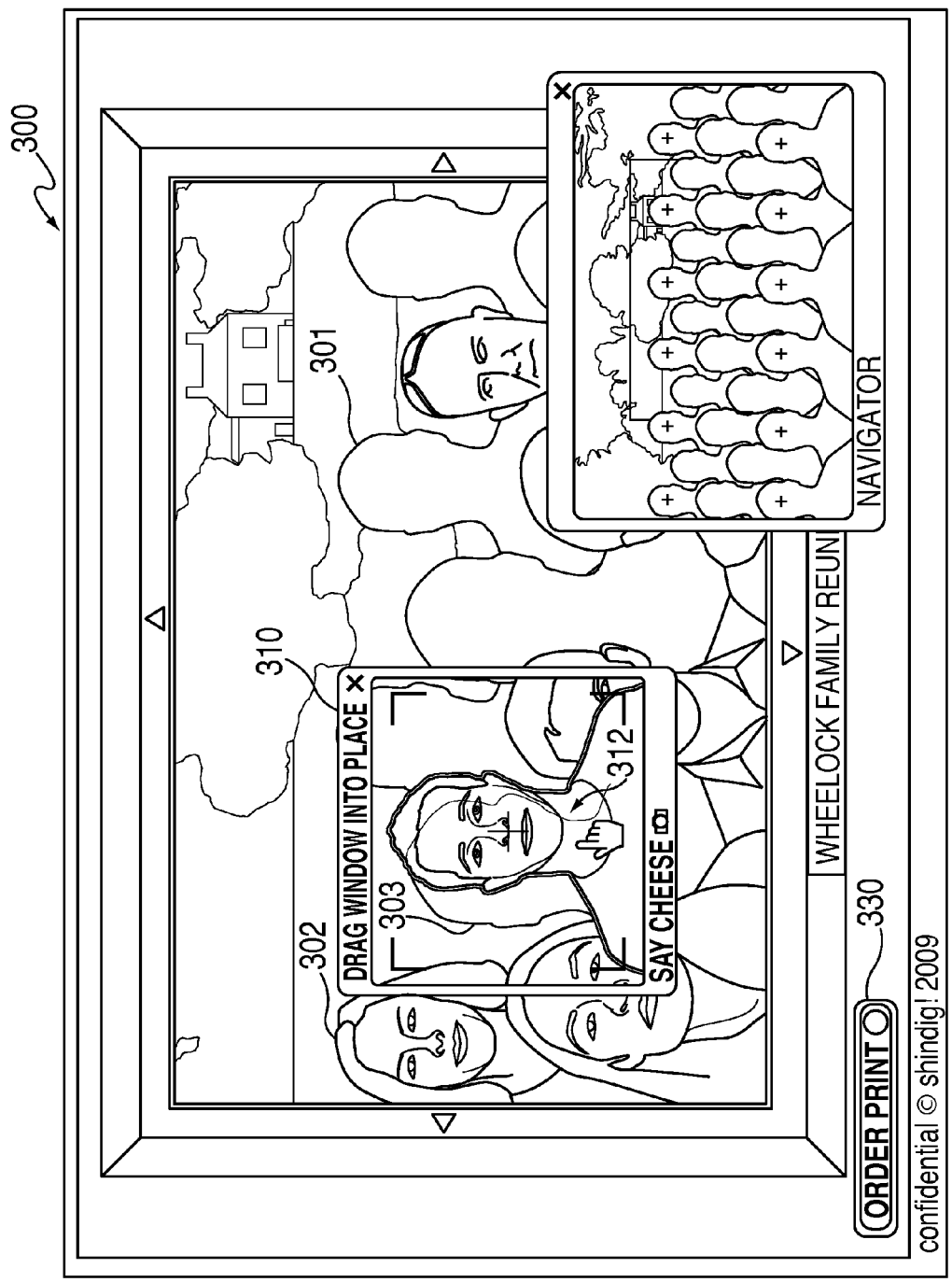
FIG. 3 is a schematic view of an illustrative group portrait creation screen in accordance with various embodiments.

As user images are added to a group portrait, the portrait creation screen may reflect such changes. For example, each user image may replace a silhouette as it is added to the group portrait. FIG. 3 includes screen 300 for creating a group portrait in accordance with one embodiment of the invention. A communications system may provide screen 300 through one or more user devices (e.g., user devices 121-124 in system 100). Screen 300 may provide a preview of a group portrait after at least some user images have been added. For example, screen 300 may include user images that have been associated with user image locations. As each location becomes associated with a user image, the silhouette may be replaced by that image. For example, user image 302 may be displayed in screen 300 as a replacement to silhouette 202 of screen 200. Screen 200 can still include one or more silhouettes representing locations that are not associated with user images (e.g., silhouette 301).

Screen 300 may include window 310 for adding a user image to the group portrait. For example, window 310 may allow a user to add an image of herself to the group portrait. In some embodiments, window 310 may include video feed 312 of a user. For example, video feed 312 may include the video output from a camera in the user device that is displaying screen 300 (e.g., one of user devices 121-124). Window 310 may be moveable over screen 300. A user may be able to move window 310 over screen 300 to position video feed 312 over a location that is not associated with a user image. In some embodiments, a communications system may automatically center window 310 over an unassociated location.

When window 310 is over a location that is unassociated with a user image, the communications system may change the appearance of the corresponding silhouette. For example, the communications system may change the color of silhouette 303 when window 310 is positioned over the corresponding location. This change in appearance can show a user how to pose for his image in the group portrait.

In some embodiments, the video feed may be adjusted before an image is captured for the group portrait. For example, the brightness or contrast of a video feed can be adjusted to match the rest of the group portrait. In another example, the size of a user in a video feed can be adjusted to match the size of the silhouette in the group portrait or the other users in the group portrait. It is understood that adjustments may be made to normalize each image so that the group portrait appears to have been captured by a single camera. Adjustments may be performed automatically by a communications system or manually by the user.

Once any adjustments have been made, the user can provide an input (e.g., by pressing a particular key or clicking once on window 310) instructing the user device to capture the image. The communications system may then generate a user image based on the video feed. In some embodiments, the user image may be adjusted after it has been captured. For example, the brightness, contrast, or size of the user image may be adjusted after the image has been captured. The communications system may then associate the captured image with the appropriate location and add the image to screen 300.

Using this procedure, other users may add images to the group portrait. If a user tries to add an image to the group portrait after all the user image locations have been utilized, the communications system may create one or more additional locations and corresponding silhouettes. For example, the communications system may create additional rows or columns of locations and corresponding silhouettes. In some embodiments, the communications system may add the additional locations to the current arrangement of user images. In other embodiments, the communications system may rearrange and/or resize the existing images to incorporate the newly added locations.

In some embodiments, a user may provide an input to request a final version of a group portrait. For example, a user may select an order print button 330 to request a final version of a group portrait. In some embodiments, the communications system may begin preparing a final version of the group portrait in response to receiving such an input. In other embodiments, the communications system may wait to prepare a final version until a user with administrative rights has finalized the portrait or until all eligible users have added an image to the portrait. To prepare a final version of the group portrait, the communications system may remove any remaining silhouettes representing locations that are not associated with images. In some embodiments, the communications system may display a background image (see, e.g., background image 204) in the unutilized locations. In other embodiments, the communications system may rearrange the user images to condense the group portrait. For example, the communications system may move one or more user images to central unutilized locations so that the group portrait doesn't include any discontinuities (e.g., gaps between user images).

Once a final version of the group portrait has been prepared, a digital or physical copy of the portrait can be provided to the user. For example, the communications system may compose a digital copy and transmit it to the user via e-mail. In another example, the communications system may print or commission a third-party to print a physical copy and then deliver it to the user.

In some embodiments, a communications system may provide users with configuration options when creating or editing a group portrait. For example, a user may be able to select a background image and/or title for a group portrait. In some embodiments, a user may be able to select the arrangement of individual images in the group portrait. The communications system may limit which users can configure the group portrait. For example, the communications system may only permit those users with administrative rights to configure the group portrait.

Figure 4:
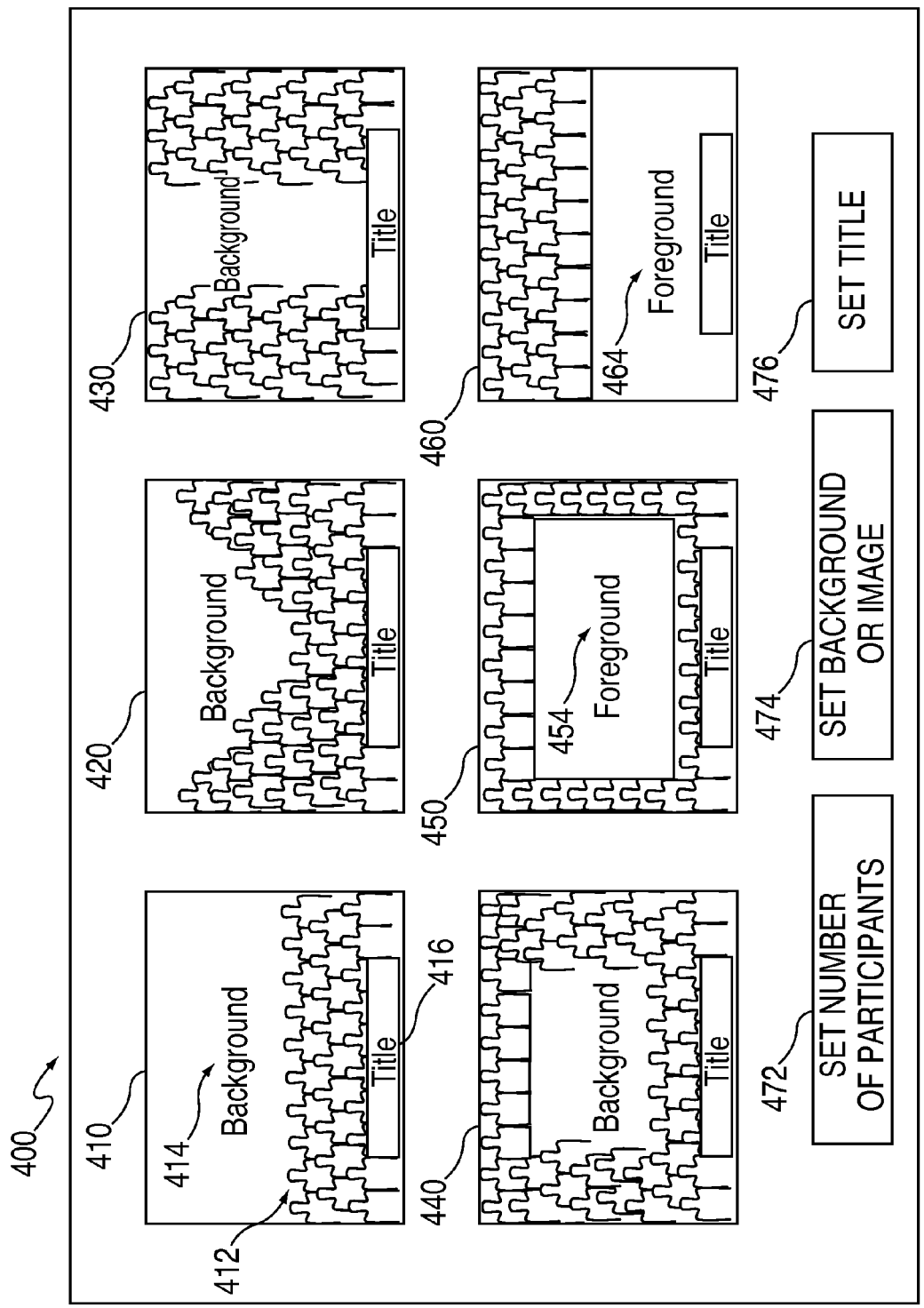
FIG. 4 is a schematic view of an illustrative group portrait configuration screen in accordance with various embodiments.

FIG. 4 includes screen 400 for configuring a group portrait in accordance with one embodiment of the invention. A communications system can provide screen 400 through one or more user devices (e.g., user devices 121-124 in system 100). The one or more user devices displaying screen 400 may receive user inputs related to screen 400 through one or more input devices (e.g., a touch screen display or computer mouse). One or more users can select options on screen 400 to rearrange or customize group portraits. Screen 400 can be displayed at the beginning of the group portrait creation process (e.g., before screen 200 is displayed), at any point during the group portrait creation process (e.g., when a user accesses a configuration menu during the process), and/or at the finalization of a group portrait (e.g., after all user images have been added).

Screen 400 can include various portrait arrangements that a user can select from when configuring a group portrait. For example, screen 400 includes bottom arrangement 410, v-shaped arrangement 420, side arrangement 430, border arrangement 440, and central image arrangement 450, and bottom image arrangement 460. Each arrangement may include silhouettes representing the locations for user images (see, e.g., silhouettes 412). Each arrangement may also include a placeholder for a group portrait's title (see, e.g., title 416). Some arrangements may include a placeholder for a background image (see, e.g., background image 414) and/or a placeholder for a foreground image (see, e.g., foreground 454 or foreground 464). In some embodiments, the silhouettes and placeholders in each portrait arrangement may be replaced by actual user images, titles, and background/foreground images as these features are added to the group portrait. In this manner, the portrait arrangements may serve as previews of different portrait configurations.

Screen 400 can include configuration options that a user can set when configuring a group portrait. For example, screen 400 may include option 472 that a user can select to set the number of user image locations that will initially be in the group portrait. Providing an initial number of user image locations and corresponding silhouettes may result in a more meaningful preview of the different portrait arrangements (see, e.g., arrangement 410) as well as the portrait itself during creation (see, e.g., screen 200). However, the number of user image locations may automatically increase if users attempt to add images to the portrait beyond the initial number. Screen 400 may include option 474 that a user can select to set the background or foreground image for a group portrait. For example, a user may select option 474 and specify an image to use as the background or foreground image for a group portrait. Screen 400 may also include option 476 that a user can select to set the title of a group portrait. For example, a user may select option 476 and specify a word or phrase as the title of a group portrait.

While screen 400 includes various options for a user to manually configure a group portrait, it is understood that a communications system may automatically configure a group portrait in some embodiments. For example, a communications system may automatically configure a group portrait to include an initial number of user image locations based on the number of users in a communications group by assuming that all or a percentage of the users in the group will add a user image to the portrait. In another example, the communications system may automatically configure a group portrait title based on the title of a communications group.

Figure 5:
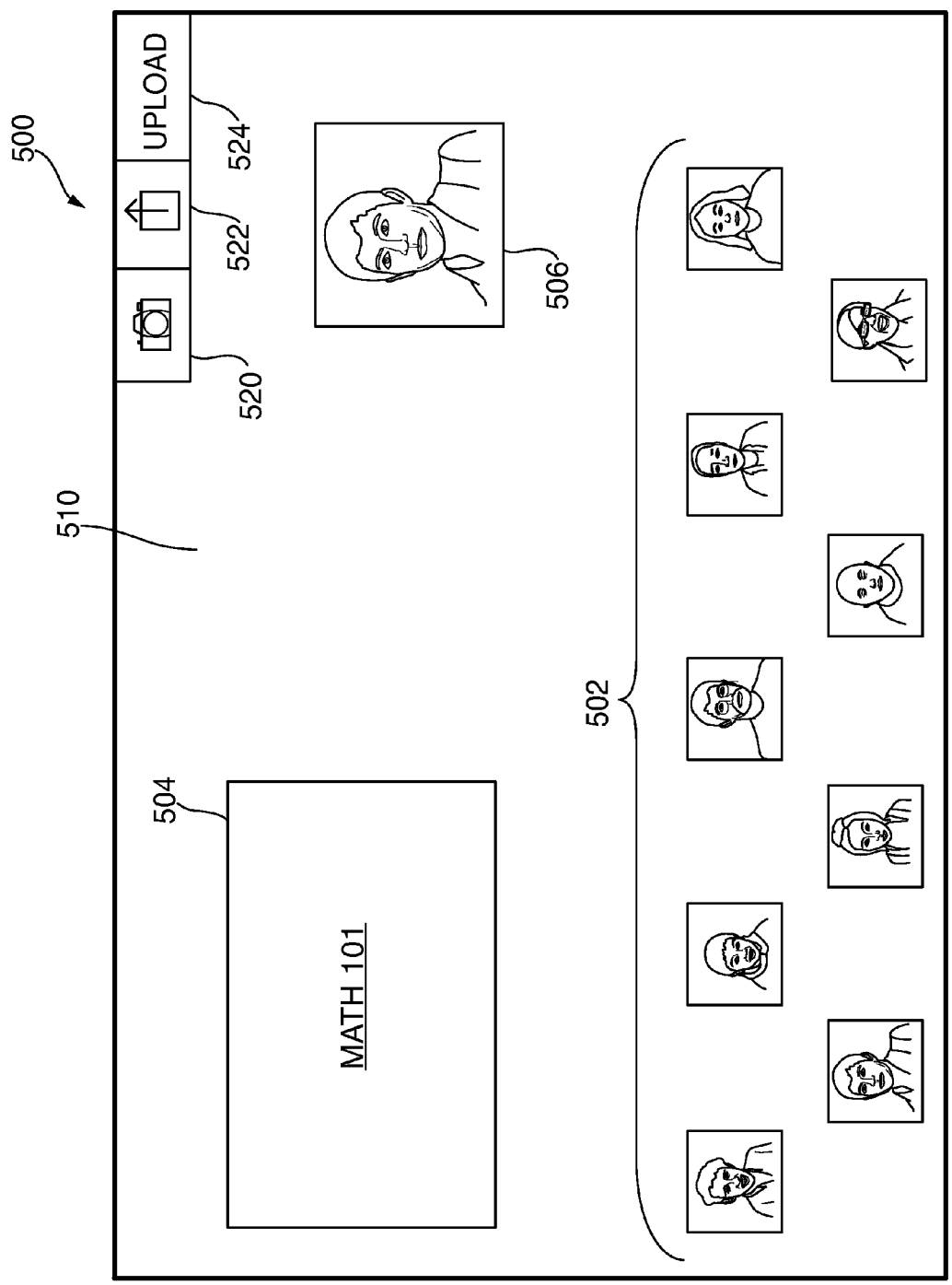
FIG. 5 is a schematic view of an illustrative user interface displaying an online event in accordance with various embodiments.

FIG. 5 is a schematic view of an illustrative user interface displaying an online event in accordance with various embodiments. User interface 500 may be displayed on a user device such as user devices 121-124 of FIG. 1. User interface 500 may display various types of online events including, but not limited to, online classes, online chat forums, conferences, presentations, lectures, meetings, concerts, and personalized gatherings.

User interface 500 may display one or more indicators 502 corresponding to one or more online participants accessing the online event. Indicators 502 may correspond to live video streams of each online participant, intermittent video of each participant, static images of each participant, pre-set images of each participant, or any other image, video, or picture, or any combination thereof, which may represent that particular online participant. A more detailed description of indicators corresponding to online participants accessing online events is described in U.S. patent application Ser. No. 14/255,475, filed on Apr. 17, 2014, which is incorporated herein by reference in its entirety.

User interface 500 may also include content window 504 and presenter window 506. Content window 504 may display various types of content that may be presented by a presenter or host of the online event, and may be directed to each online participant accessing the event. Presenter window 506 may display live video of the online event's presenter and/or host. In some embodiments, presenter window 506 may function similar to indicators 502, with the exception that presenter window 506 may correspond to the presenter presenting materials for the online event. A more detailed description of content and presenter windows is described in U.S. patent application Ser. No. 14/051,113, filed on Oct. 10, 2013, which is incorporated herein by reference in its entirety.

User interface 500 may further display background 510. Background 510 may include any image, video, or picture selected by a user of the user device displaying user interface 500. In some embodiments, background 510 may be set or programed by the host or administrator of the online event. However, in some embodiments, background 510 may be blank or may not include any particular background image. For example, background 510 may be a plain white background. As another example, background 510 may be a repeating video of waves crashing at the beach.

User interface 500 may further include capture button 520, share button 522, and upload button 524. Capture button 520 may allow a user to capture an image using their user device. For example, a user may be capable of capturing an image of the online event displayed on user interface 500. Share button 522 may allow the user to share the capture image within one or more social media networks or with one or more additional online participants or contacts via an SMS message, an MMS message, an email, an instant message, or using any other sharing mechanism, or any combination thereof. Upload button 524 may allow a user to upload an image, a video, or a contextual communication to the online event, which may be displayed on user interface 500 and/or shared using share button 522.

Figure 6:
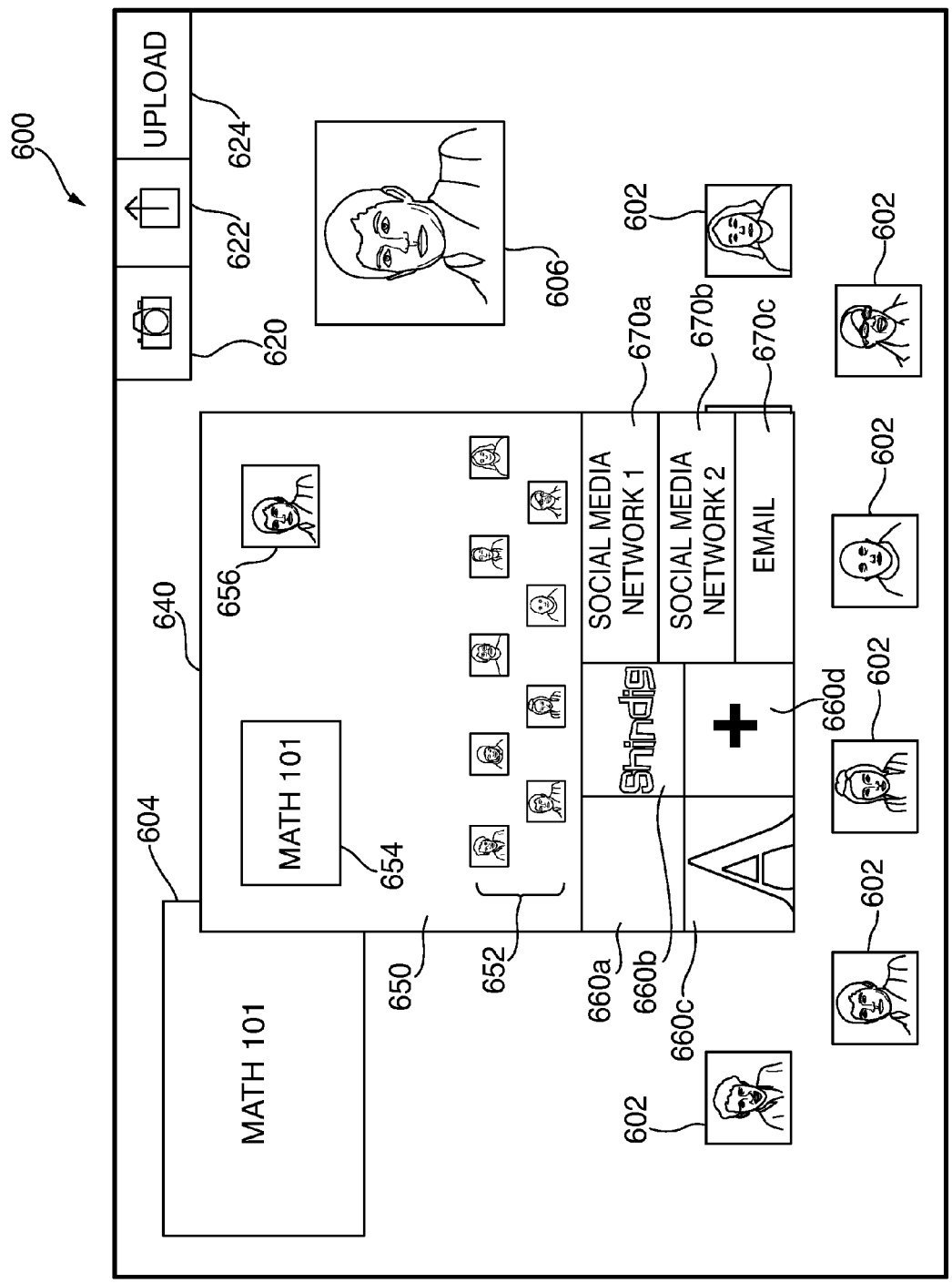
FIG. 6 is a schematic view of an illustrative user interface displaying an online event and a pop-up window in accordance with various embodiments.

FIG. 6 is a schematic view of an illustrative user interface displaying an online event and a pop-up window in accordance with various embodiments. User interface 600 may include indicators 602, content window 604, presenter window 606, capture button 620, share button 622, and upload button 624, which may be substantially similar to user interface 500, indicators 502, content window 504, presenter window 506, capture button 520, share button 522, and upload button 524, and the previous description may apply. In some embodiments, FIG. 6 may display a user interface displayed in result to a user pressing capture button 520 of FIG. 5. In some embodiments, a user may press capture button 520 of FIG. 5 to capture an image of the online event. In response to the capture button being pressed, capture button 620 may be displayed in a slightly darkened or shaded format to indicate to the user that the button has been pressed and that the user interface, or user device, may now also be in an image capturing mode.

In some embodiments, in response to pressing the capture button 620, pop-up window 640 may be displayed within user interface 600. Pop-up window 640 may, in some embodiments, be displayed at the forefront or foreground of user interface 600 such that objects, such as indicators 602 and/or content window 604, may be partially blocked by pop-up window 640. Persons of ordinary skill in the art will recognize that although pop-up window 640 is displayed in the center of user interface 600, pop-up window 640 may be located anywhere within user interface 600 (e.g., top right, bottom left, etc.) and may have any size or shape. For example, pop-up window 640 may be substantially "full screen" and may encompass most or all of user interface 600. As another example, pop-up window 640 may be displayed on a completely separate screen of the user device. Pop-up screen 640 may also be transparent or slightly transparent as to allow a user to see any objects displayed on user interface 600 that may be located "behind" pop-up window 640.

Pop-up window 640 may include user interface portion 650. User interface portion 650 may, in some embodiments, display a screenshot of user interface 600 displaying the online event. For example, user interface portion 650 may display content window portion 654, presenter window portion 656, and indicator portions 652, which may be substantially similar to content window 604, presenter window 606, and indicators 602 with the exception that the former may be smaller versions captured from a screenshot or image capture of the user interface in response to pressing capture button 620.

Pop-up window 640 may also include background options 660a-660c. In some embodiments, a user may seek to place a specific background or logo in the capture image from the online event. For example, a user may want to place a brand or company logo in the background of a captured image. This may be accomplished by selecting one of background options 660a-c, which may replace the previous background displayed on the user interface for the online event. Referring back to FIG. 5, user interface 500 may include background 510, which may be blank. A user may decide to place a company logo, such as in background option 660b in the background of the captured image, so that any sharing or publishing of the captured image of the online event also includes the logo. In some embodiments, the user may select to add a different background than the background included within background options 660a-c by selecting plus button 660d. This may allow a user to add a new background option to the list of backgrounds displayed within pop-up window 640. Persons of ordinary skill in the art will recognize that any number of backgrounds may be included within pop-up window 640, and the use of three background options and the plus button to add another background option is merely exemplary.

Pop-up window 640 may also include one or more sharing options for the user to share the captured image. For example, pop-up window 640 may include sharing options 670a-c. Sharing options 670a-c may enable a user to share or publish the captured image, or a modified version of the captured image, using any suitable sharing mechanism. For example, the user may select sharing option 670a, which may allow the user to publish the captured image using "SOCIAL MEDIA NETWORK 1". As another example, the user may select sharing option 670c, which may allow the user to send the captured image using the user's email account. Persons of ordinary skill in the art will recognize that any number of sharing options may be used, and the sharing options may correspond to any suitable mechanism for sharing content, and the aforementioned are merely exemplary.

Figure 7:
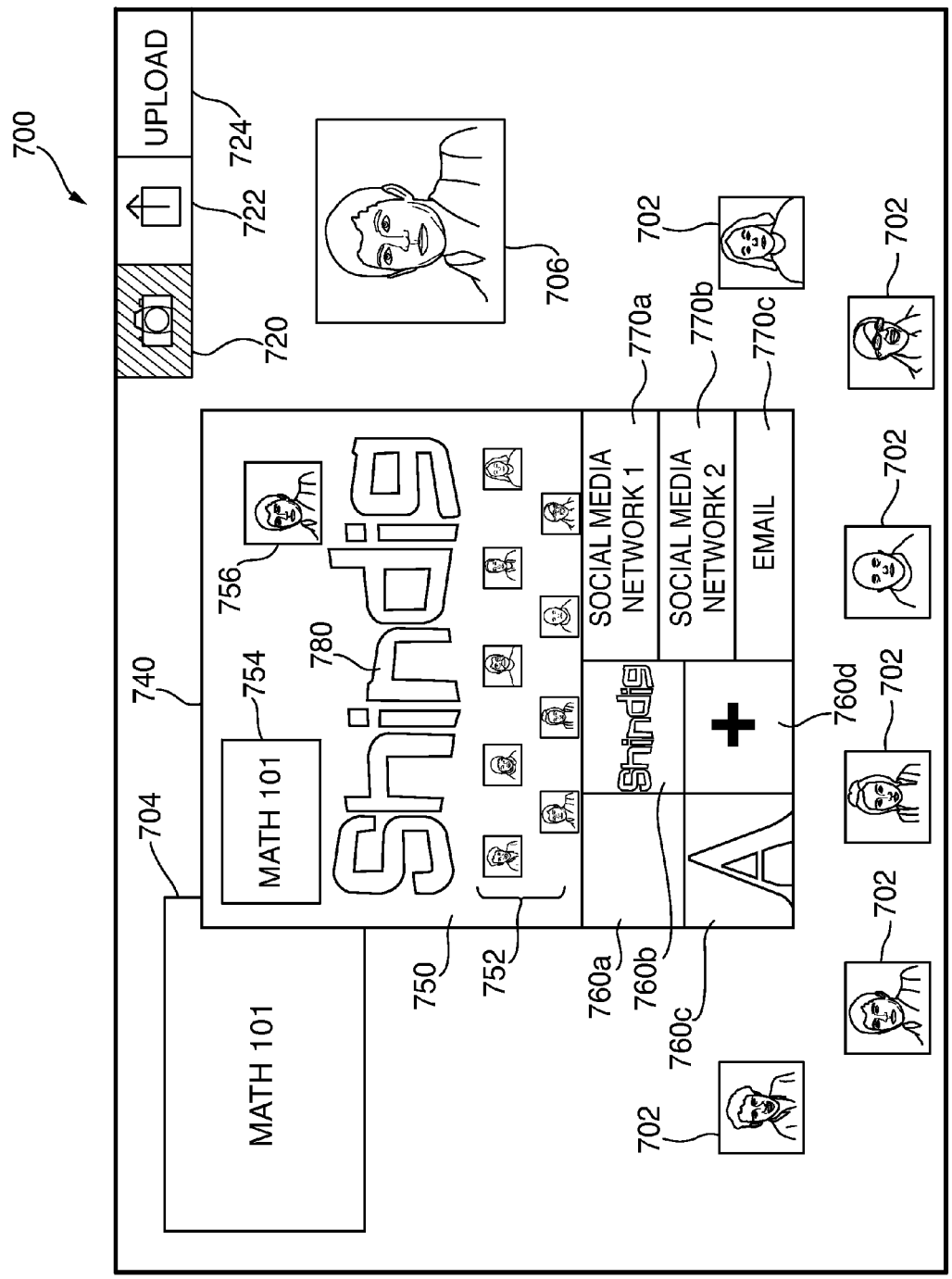
FIG. 7 is a schematic view of another illustrative user interface displaying an online event and a pop-up window in accordance with various embodiments.

FIG. 7 is another schematic view of an illustrative user interface displaying an online event and a pop-up window in accordance with various embodiments. User interface 700 may, in some embodiments, be substantially similar to user interface 600, with the exception that a displayed pop-up window may present the captured image with a customized logo or background therein. User interface 700 may include indicators 702, content window 704, presenter window 706, capture button 720, share button 722, upload button 724, and pop-up window 740, which may be substantially similar to indicators 602, content window 604, presenter window 606, capture button 620, share button 622, upload button 624, and pop-up window 640 of FIG. 6, and the previous description may apply. Furthermore, pop-up window 740 may display user interface portion 750 including content window portion 754, presenter window portion 756, and indicator portions 752, as well as backgrounds 760a-c and sharing options 770a-c, which may be substantially similar to user interface portion 650 including content window portion 654, presenter window portion 656, and indicator portions 652, as well as backgrounds 660a-c and sharing options 670a-c of FIG. 6, and the previous description may apply.

In some embodiments, a user may select a background to insert or to replace a background previously displayed within the user interface. For example, initially user interface 500 may include background 510, which may be a blank or solid white background. In this scenario, a user may be presented with background options 660a-c, as shown in FIG. 6, and select one to replace background 510. As a particular example, a user may select background option 660b to be used as the background for the captured image. In response to the selection, logo 780 may be placed in user interface portion 750 to display the captured image with the particular background image selected. This may allow the user to preview the captured image with the new background prior to publishing the captured image.

In some embodiments, after the user has selected a background option (e.g., logo 780), the user may decide to modify the newly selected background. For example, a user may select to have logo 780 appear in the background initially, but may decide a different version of the logo, or a different background may look better or fit better within the background of the captured image. In this scenario, the user may select a different background option from options 760a-c, or choose to add a new background image using option 760d.

In some embodiments, after the user has selected a suitable background, the user may choose to publish or share the captured image using one or more of sharing options 770a-c. For example, a user may select sharing option 770a to share the captured image including the selected background user "SOCIAL MEDIA NETWORK 1". This may allow the user to post the captured image to the selected social media network so that all of the user's contacts on the social media network may view the captured image. In some embodiments, the user may first be required to log-in to the social media network prior to publishing the capture image.

Figure 8:
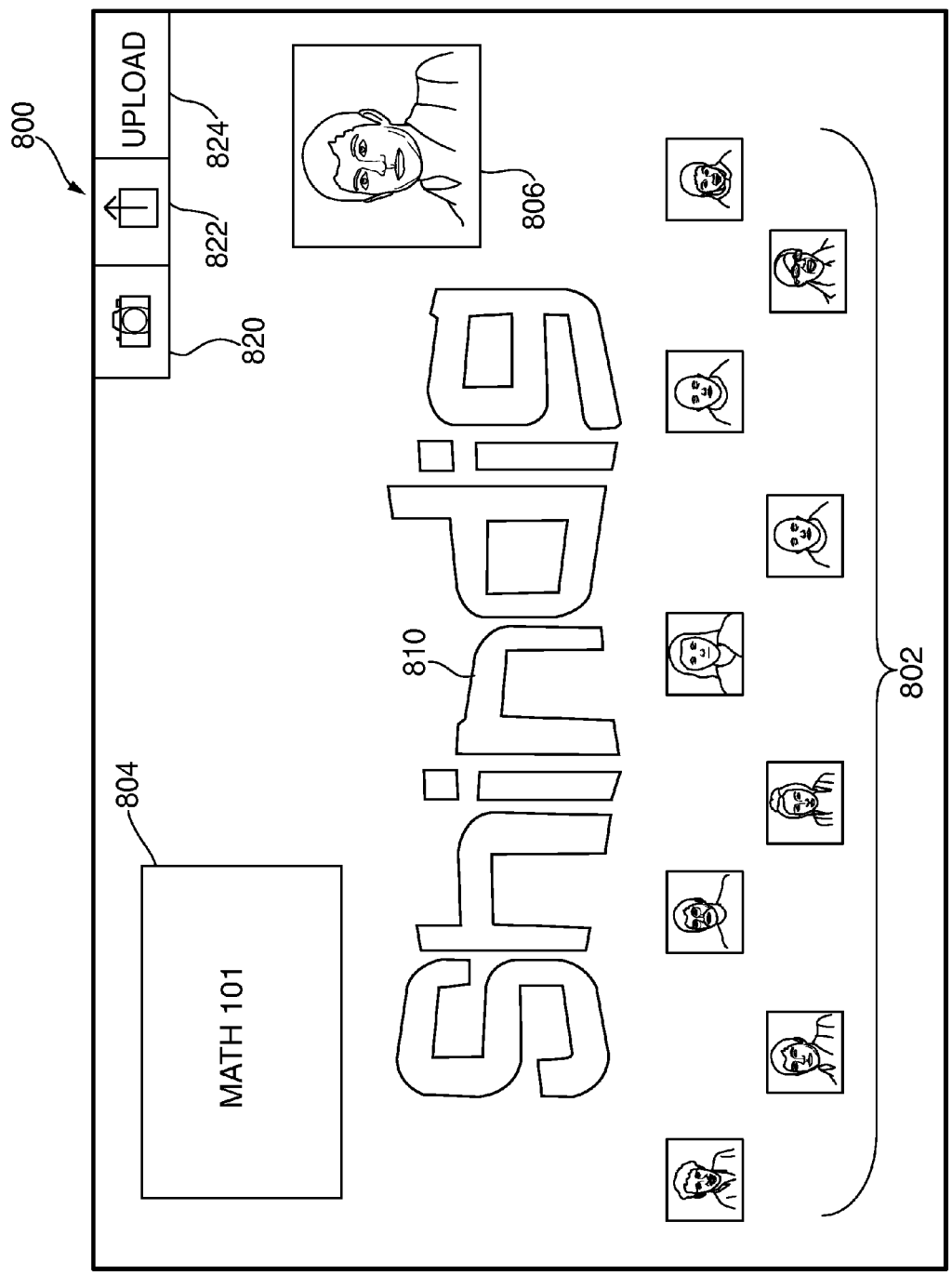
FIG. 8 is a schematic view of another illustrative user interface displaying an online event in accordance with various embodiments.

FIG. 8 is another schematic view of an illustrative user interface displaying an online event in accordance with various embodiments. User interface 800 may present a user interface that includes a modified background selected using a pop-up window, such as pop-up window 740 of FIG. 7, and which may be published using one or more sharing options. User interface 800 may also display a final version of the captured image of the online event that will be, or has been, published.

User interface 800 may include indicators 802, content window 804, presenter window 806, capture button 820, share button 822, and upload button 824, which may be substantially similar to indicators 502, content window 504, presenter window 506, capture button 520, share button 522, and upload button 524 of FIG. 5, with the exception that user interface 800 may include logo 810 included within the background. User interface 800 may appear substantially similar to user interface portion 750 of FIG. 7, with the exception that user interface 800 may allow a user to interact with the user interface. For example, the user may select sharing button 822 to share user interface 800 with one or more contacts or social media networks. In some embodiments, user interface 800 may correspond to a finalized image that was shared by a user in response to selecting one of sharing options 770a-c of FIG. 7.

Figure 9:
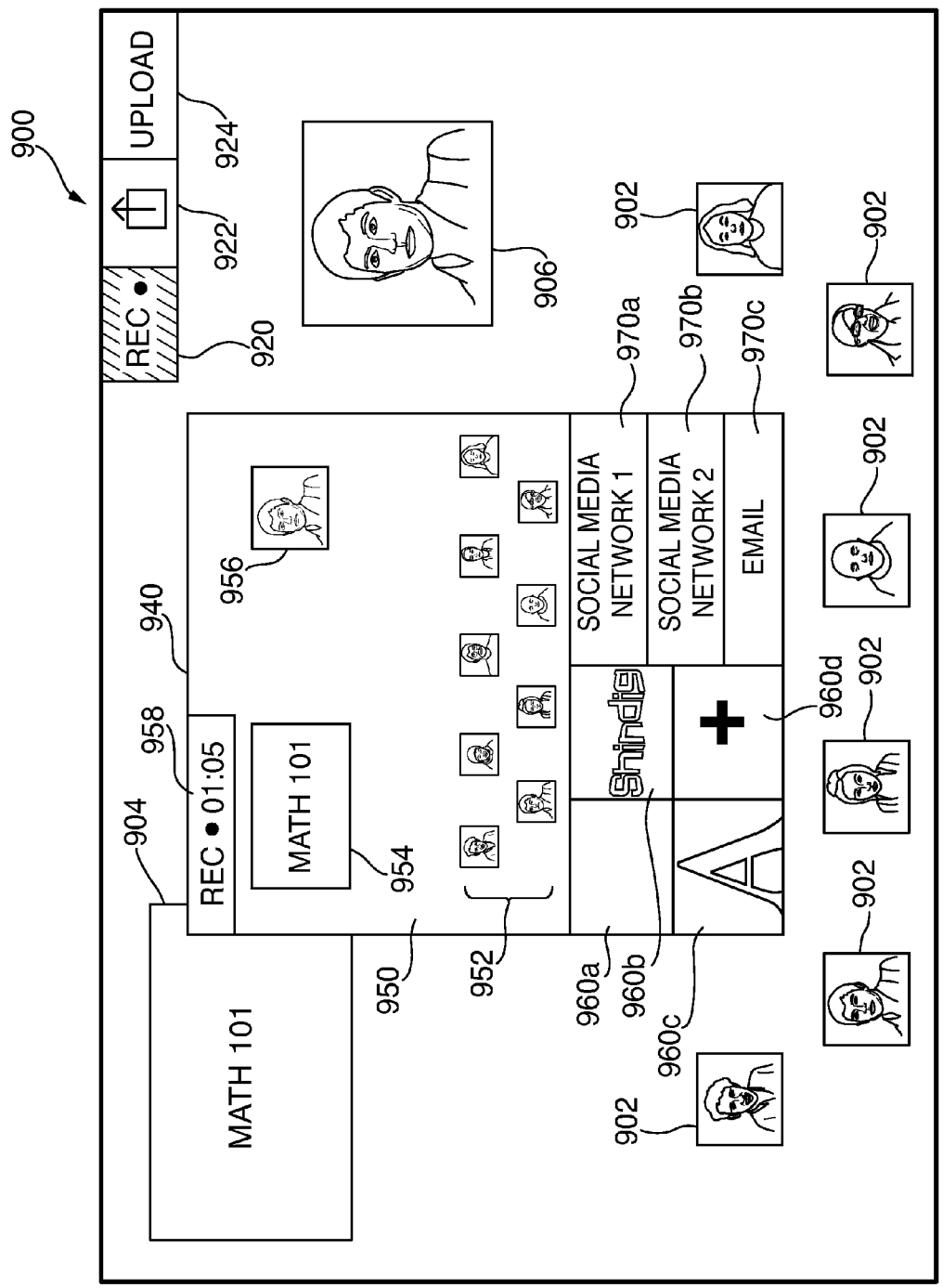
FIG. 9 is a schematic view of yet another illustrative user interface displaying an online event and a pop-up window in accordance with various embodiments.

FIG. 9 is yet another schematic view of an illustrative user interface displaying an online event and a pop-up window in accordance with various embodiments. User interface 900 may include indicators 902, content window 904, presenter window 906, share button 922, upload button 924, and pop-up window 940, which may be substantially similar to indicators 602, content window 604, presenter window 606, share button 622, upload button 624, and pop-up window 640 of FIG. 6, with the exception that the former may include record button 920. Record button 920 may be substantially similar to image capture button 620 of FIG. 6, with the exception that record button 920 may allow a user to capture video and/or audio recordings from within the online event being accessed. Pop-up window 940 may further display user interface portion 950 including content window portion 954, presenter window portion 956, and indicator portions 952, as well as backgrounds 960a-c and sharing options 970a-c, which may be substantially similar to user interface portion 650 including content window portion 654, presenter window portion 656, and indicator portions 652, as well as backgrounds 660*a-c* and sharing options 670*a-c* of FIG. 6, and the previous description may apply.

In some embodiments, pop-up window 940 may also include recording indicator 958, which may be displayed within user interface portion 950. Recording indicator 958 may indicate to a user an amount of time that the presented user interface of the online event has been recorded for. In some embodiments, a user may select recording option 920 which may prompt pop-up window 940 to display within user interface 900. At this point, the user may be capable of recording live video from the user interface, which may then be published to one or more contacts of the user and/or using one or more social media networks.

As an illustrative example, a user may be attending a concert being broadcast over the internet. The user may select record option 920 which may cause pop-up window 940 to appear within the user interface. As the concert progresses, the user may record the live video and/or audio, as well as be able to view the images that are being recorded within user interface portion 950. Recording indicator 958 may indicate an amount of time that the user has been recording video for. This may be extremely beneficial as there may be storage limitations for the user device as to how much video it can store, or there may be a limit to the length of time that certain social media networks may allow uploaded videos to be.

In some embodiments, the user may pause the recording, stop the recording, and/or restart the recording by pressing recording option 920. In some embodiments, the user may export the captured video to one or more media players resident on their user device to edit the video and/or modify the video prior to publishing the video using one or more of sharing options 970*a-c*.

In some embodiments, the user may modify the background of the user interface being recorded by selecting one of background options 960*a-c*, or by adding a different background using option 960*d*. This process may be substantially similar to that of FIG. 7, with the exception that the added background may be included in the recorded video from the point that it was added until the end of the video. For example, a user may begin to record the online event, where initially the user interface being recorded includes no background. While the recording is ongoing, the user may select to add a logo, such as the logo included within background option 960*b*. After the selection occurs, the logo may be added to the background of the user interface being recorded. In some embodiments, the user may be capable of modifying the background after the video has finished recorded by selecting one or more of the other background options. However, persons of ordinary skill in the art will recognize that any video modification and/or editing technique may be used for this purpose after the video has already been captured and exported to an auxiliary editing program.

After the user has completed recording the video, the user may select to publish the video using one or more of sharing options 970*a-c*, for example. The video may, in some embodiments, be stored in memory on the user device and/or on a server hosting the online event after the recording is complete. For example, after finishing recording, the user may select sharing option 970*a*, which may prompt the user to select the previously recorded video from memory on the user device.

In some embodiments, in addition to, or instead of, recording video and audio, textual communications may be extracted from the recording. For example, a user may record audio and/or video from an online event, and the audio may be transcribed into text as the audio is recorded. This may allow the user to share either the audio itself and/or a transcription of the audio using one or more sharing options. The transcribing of the audio may occur using any number of transcription programs and/or services which may be resident on the user device and/or external (e.g., a machine-based translator accessed via a web-browser).

Figure 10:
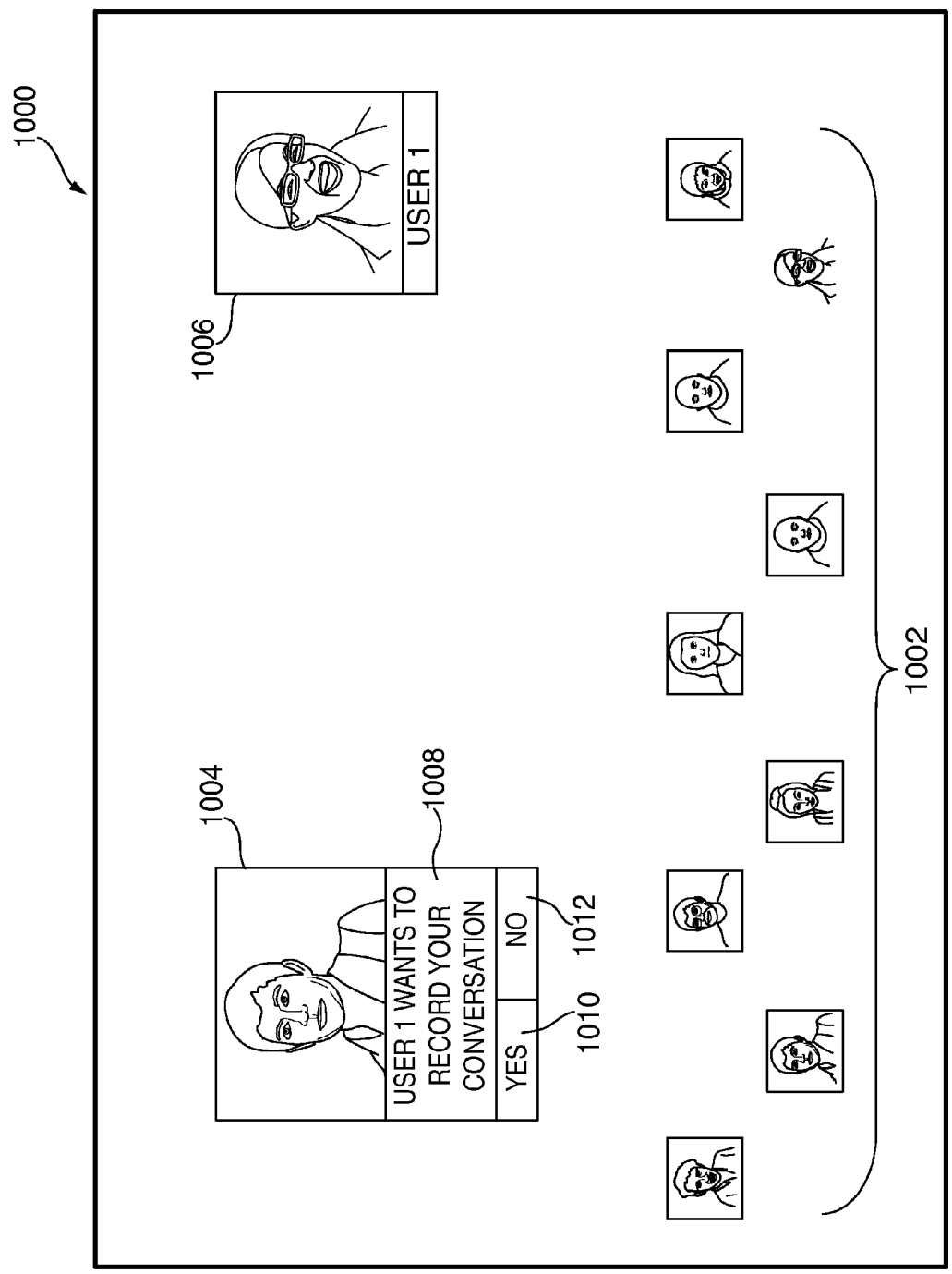
FIG. 10 is a schematic view of an illustrative user interface displaying a request for a user to have their communications recorded in accordance with various embodiments.

FIG. 10 is a schematic view of an illustrative user interface displaying a request for a user to have their communications recorded in accordance with various embodiments. User interface 1000 may, in some embodiments, be substantially similar to user interface 500 of FIG. 5, with the exception that user interface 1000 may include two user chat windows. For example, user interface 1000 may include first chat window 1004 and second chat window 1006. In some embodiments, user interface 1000 may also include indicators 1002, which may be substantially similar to indicators 502 of FIG. 5, and the previous description may apply.

Chat windows 1004 and 1006 may correspond to indicators of two users of an online event that are in a group with one another, in a chat with one another, and/or in any form of private or semi-private communication with one another. In some embodiments, chat windows 1004 and 1006 may correspond to two online participants of an event who are not yet in communication with one another, but one of the online participants has requested to be in communication with the other online participant. For example, chat window 1006 may correspond to a first user, "USER 1". USER 1 may send a request to start a recorded video chat with a second user corresponding to chat window 1004. In some embodiments, the second user may correspond to the user who may be displayed user interface 1000 on their user device.

In response to a request to start a recorded video chat with USER 1, the second user may receive message 1008, indicating that USER 1 wants to record their conversation. In some embodiments, the user may have already accepted an invitation to start a chat with USER 1, or the request to record the conversation may serve as the request to start the chat. Chat window 1004 may also display two options for the user receiving the request, "YES" option 1010 and "NO" option 1012. If the user selects option 1010, USER 1 and the second user may begin a recorded video chat. If, however, the user selects option 1012, USER 1 and the second user may not begin a recorded video chat, but they may still begin a video chat with one another if they so desire. In some embodiments, instead of requesting to have a recorded video chat, the request may be to have a recorded audio chat, a recorded text chat, and/or an audio/video chat that is transcribed into a text that is recorded. In some embodiments, these recorded communications may be published using one or more sharing options, such as sharing options 970*a-c* of FIG. 9.

Figure 11:
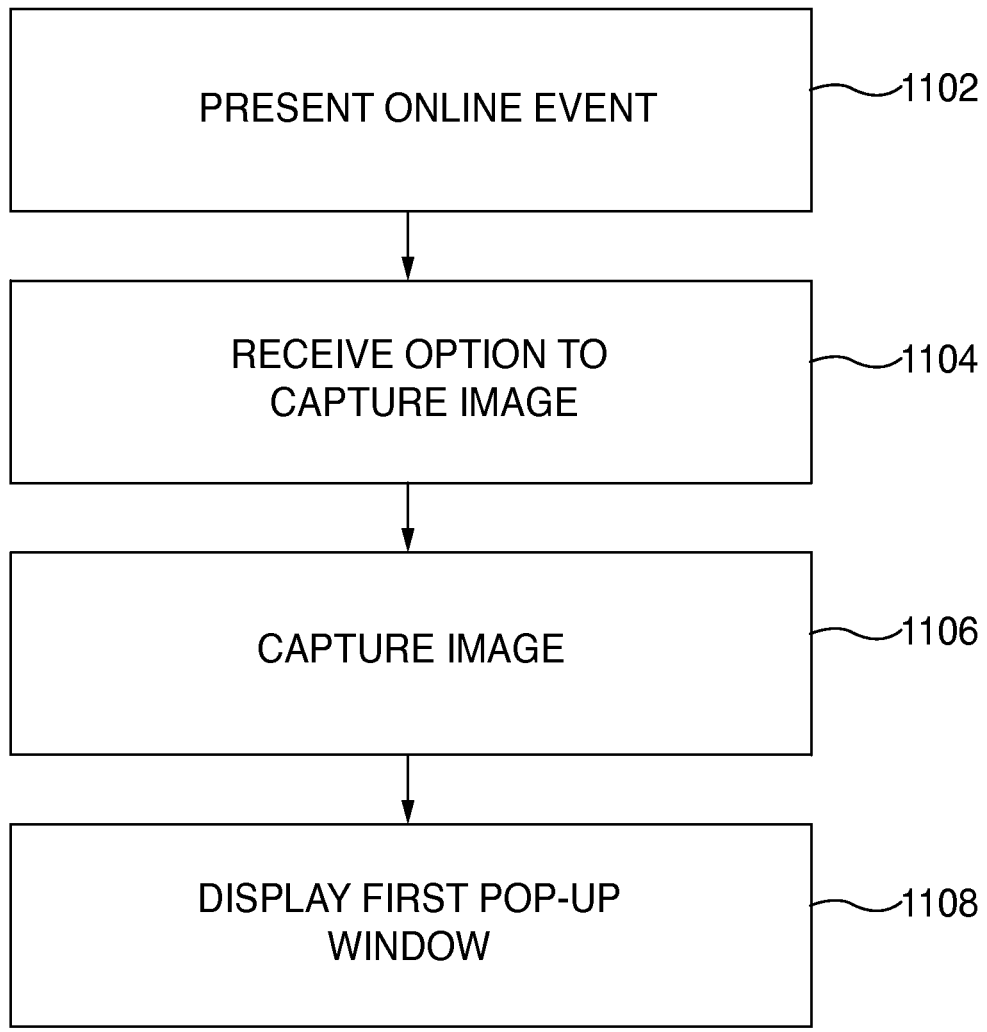
FIG. 11 is a flowchart of an illustrative process for displaying a pop-up window in accordance with various embodiments.

FIG. 11 is a flowchart of an illustrative process for displaying a first pop-up window in accordance with various embodiments. Process 1100 may begin at step 1102. At step 1102, an online event may be presented on a user interface of a user device. For example, user interface 500 of FIG. 5 may be displayed on a user device, such as user devices 121-124 of FIG. 1. In some embodiments, the online event may be hosted by a server, such as server 110, which may be accessed by one or more online participants using user devices 121-124. Each online participant may view a user interface on their device that appears similar to user interface 500, with the exception that each user interface may be customizable for each different user.

In some embodiments, the presented online event may include a plurality of indicators corresponding to each of the online participants accessing the online event. For example, indicators 502 of FIG. 5 may each correspond to a separate online participant accessing the online event. In some embodiments, indicators 502 may represent a portion of all of the online participants accessing the event. For example, if there are one thousand (1,000) online participants accessing the event, it may be difficult to display them all clearly on a single user interface. In this scenario, the server hosting the online event may selectively or randomly pick certain online participants that will have their corresponding indicators displayed on the user interface. In some embodiments, the indicators displayed on the user interface may change over time to allow a user to view various online participants' indicators.

Each indicator may, in some embodiments, include streaming or intermittent video of the corresponding online participant. The quality of the video may be dependent on the network setting of the user device and/or the user device's connection status with the server. In some embodiments, each indicator may include a picture corresponding to the online participant, a static image selected by the corresponding online participant, or the indicator may be blank.

The online event may also include a content window and a presenter window, such as content window 504 and presenter window 506 of FIG. 5. Content window 504 may, in some embodiments, display any suitable form of content that may be displayed to each online participant accessing the event. Presenter window 506 may, in some embodiments, display video and/or audio communications corresponding to a presenter for the online event. In some embodiments, the presenter may decide the content that is to be displayed within content window 504.

The user interface may also present the online event including a background, such as background 510. The background may initially be selected by a user of the user device displaying the user interface, or it may be set by the server hosting the online event. For example, background 510 may correspond to a blank background. In this scenario, the online event may have not set a background or the event's administrator may have set the background to be blank. Persons of ordinary skill in the art will recognize that any background may be initially in place for the online event, and the use of a blank background is merely exemplary.

At step 1104, an option, such as a request to capture an image, may be received by the server hosting the online event. Within the presented online event, there may also be an image capture button, such as capture button 520. The capture button may allow a user to capture an image of the user interface currently being displayed on their user device. In some embodiments, the capture button may allow a user to capture an image using an image capturing component resident on the user device. For example, pressing capture button 520 may allow a user to capture a photograph using their user device.

In some embodiments, in response to pressing the image capture button, a signal may be transmitted to the server hosting the online event indicating that a particular online participant seeks to capture an image of the online event. Upon receiving the signal, the server may perform one or more additional actions to make the online event presentable for capture by a user. For example, the server may send a command to the user device to freeze the video streams of each indicator so that a blurry image is not captured for a particular indicator.

At step 1106, the image of the user interface displaying the online event may be captured. As previously mentioned, the capturing of the image may be in response to the capture button being pressed. In some embodiments, in response to pressing the image capture button, a signal may be sent from the user device to the server hosting the online event. The signal may indicate an option selected by the user to capture an image of the user interface currently being displayed on the user device. In response to receiving the signal, the server may capture the corresponding image being sent to the user device that displays the online event. This may allow the corresponding image sent to the user device to not include some commands, such as a picture of image record button 520, share button 522, and/or upload button 524, for example. In some embodiments, steps 1104 and 1106 may occur at a substantially same time.

At step 1108, a pop-up window may be displayed within the user interface presenting the online event. For example, pop-up window 640 may be displayed on user interface 600 in response to a user of the user device displaying user interface 600 pressing an image capture button (e.g., capture button 520 of FIG. 5). In some embodiments, the pop-up window may appear at a substantially same time as the pressing of the image capture button. In some embodiments, however, the pop-up window may be displayed after the image capture option has been received by the server, and the image has been captured.

After the image has been captured, it may be displayed within the pop-up window. For example, pop-up window 640 may include user interface portion 650, which may be correspond to a captured image of the user interface displaying the online event (e.g., user interface 500 of FIG. 5). User interface portion 650 may include indicator portion 652, content window portion 654, and presenter window 656, which may be substantially similar to indicators 502, content window 504, and presenter window 506, with the exception that they have been captured in an image format and displayed within pop-up window 640.

The displayed pop-up window may further include one or more background options for the captured image. For example, background options 660a-c may be included within pop-up window 640, and a user may select one to replace background 510 of the captured image. In some embodiments, the user may add one or more additional backgrounds by using option 660d.

The displayed pop-up window may also include one or more sharing options for publishing the captured image. For example, sharing options 670a-c may allow the user to share the captured image with one or more contacts and/or using one or more social media networks.

Figure 12:
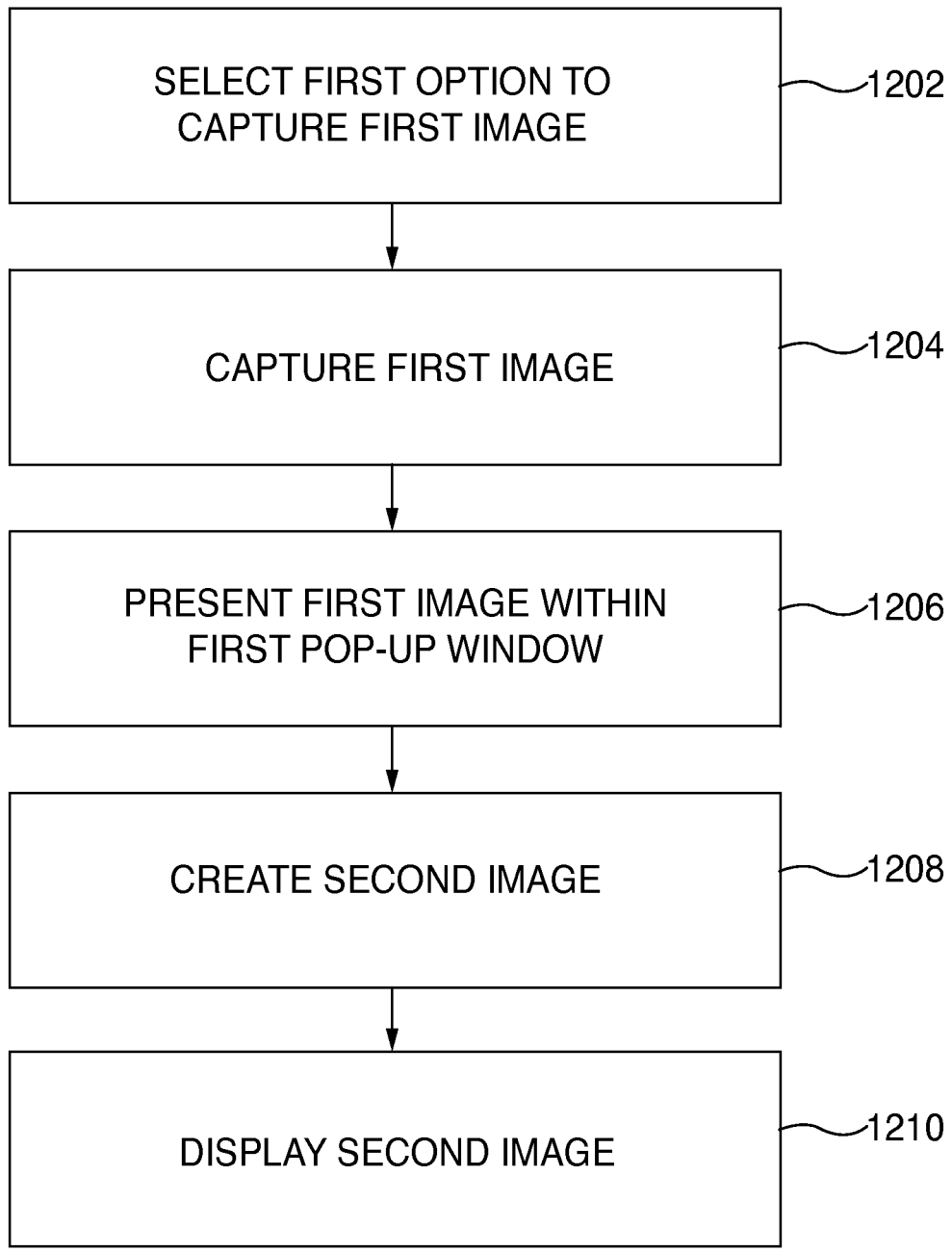
FIG. 12 is a flowchart of an illustrative process for displaying multiple pop-up windows in accordance with various embodiments.

FIG. 12 is a flowchart of an illustrative process for displaying multiple pop-up windows in accordance with various embodiments. Process 1200 may begin at step 1202. At step 1202, a user may select an option to capture a first image. For example a user may capture an image corresponding to a user interface being displayed on their user device of an online event that they may be attending. In some embodiments, step 1202 of FIG. 12 may be substantially similar to step 1104 of FIG. 11, and the previous description may apply.

At step 1204, a first image may be captured. For example, in response to selection of the option to capture the first image, the user device may capture a first image of the user interface. As another example, in response to selecting the option to capture the first image, the user may capture an image using an image capturing component resident on their user device. In some embodiments, step 1204 of FIG. 12 may be substantially similar to step 1106 of FIG. 11, and the previous description may apply.

At step 1206, the captured first image may be presented within a first pop-up window within the user interface. For example, a user may select the option to capture the first image of the user interface, and in response the image may be captured and displayed within a pop-up window. In some embodiments, step 1206 of FIG. 12 may be substantially similar to step 1108 of FIG. 11, and the previous description may apply.

At step 1208, a second image may be created. For example, a user may select a new background for the captured image using one of background options 660*a-c*. As previously mentioned, the online event displayed within the user interface may initially have a background, such as background 510, which may be blank or may include a first pre-set image. In the scenario where the background is blank, for example, the user may decide that they would like to include a logo or a specific background image to be inserted within the background of the captured image. This may allow the user to publish or share the image with the desired background.

As an illustrative example, the user may decide that they want to include a logo of a brand or company, such as a company used for hosting the online event that the image was captured from. In this particular scenario, the user may select a background option including the logo of that company. For example, a user may select background option 660*b*, which includes a logo of a company. In response to selecting background option 660*b*, the user interface portion may update the captured image of the online event to now include background option 660*b*.

At step 1210, the second image may be displayed within a second pop-up window within the user interface. For example, pop-up window 740 may include user interface portion 750 including logo 780. User interface portion 750 including logo 780 may correspond to the original captured image of the online event, presented within pop-up window 640 as user interface portion 650, but now including the added new background corresponding to background option 660*b*. In some embodiments, the creation of the second image including the new background and the displaying of the second image within the pop-up window may occur at a substantially same time. In some embodiments, the creation of the second image may occur on the server. For example, in response to selecting a background option (e.g., background option 660*b*), the background option and the captured image may be combined on the server and then sent back to the user device. At this point, the combined new image, or second image, may be displayed within the second pop-up window.

In some embodiments, the first pop-up window and the second pop-up window may be substantially similar. For example, the first pop-up window may be presented in response to the selection of the option to capture the first image and/or the capturing of the first image. After the second image has been created, it may be displayed within the first pop-up window in place of where the captured first image was located. However, persons of ordinary skill in the art will recognize that the first pop-up window may be replaced partially and/or entirely with the second pop-up window. In some embodiments, the first pop-up window and the second pop-up window may be displayed within a same user interface on a user device.

Figure 13:
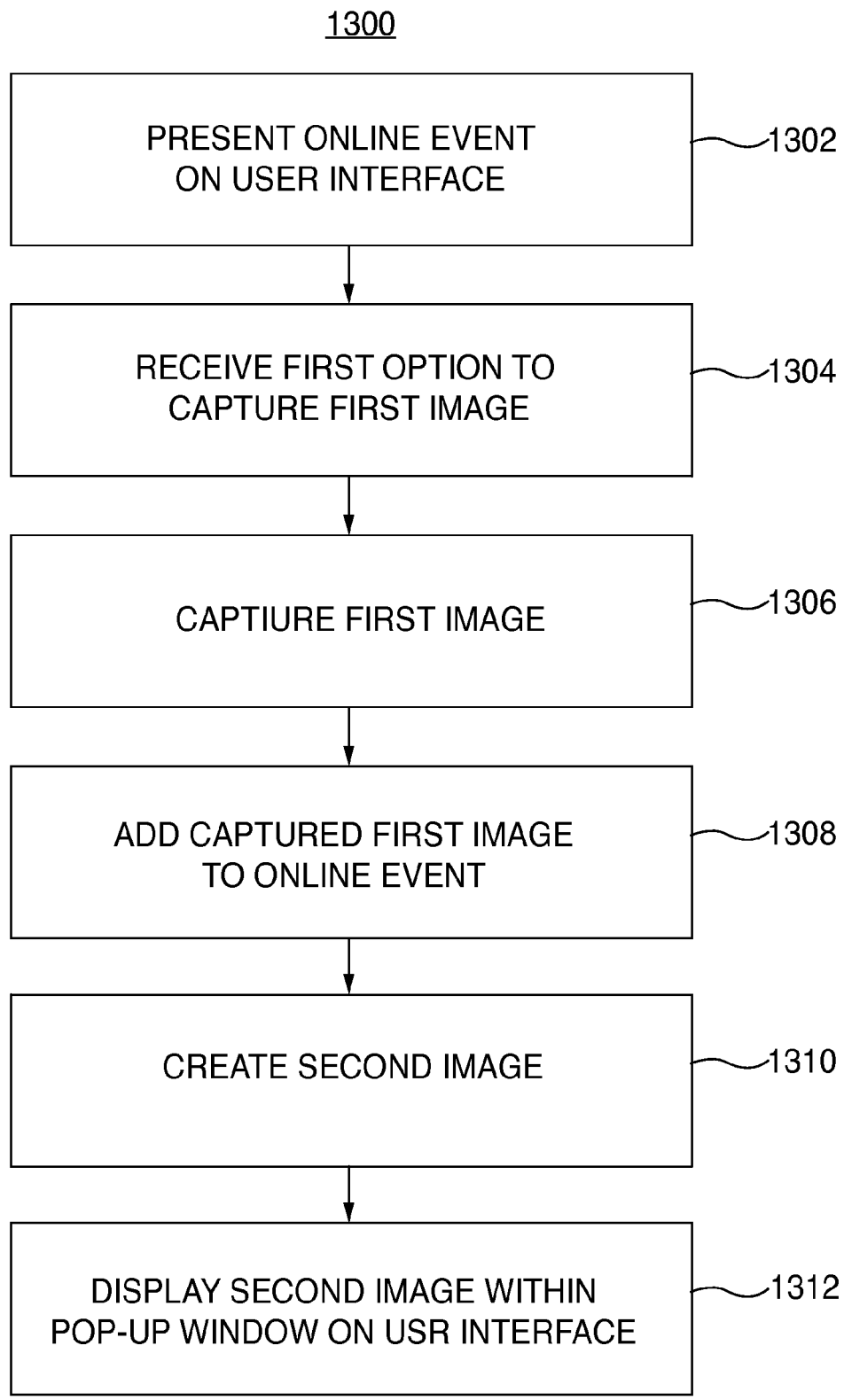
FIG. 13 is a flowchart of an illustrative process for displaying a captured image added to an online event within a pop-up window in accordance with various embodiments.

FIG. 13 is a flowchart of an illustrative process for displaying a captured image added to an online event within a pop-up window in accordance with various embodiments. Process 1300 may begin at step 1302. At step 1302, an online event may be presented within a user interface displayed on a user device. For example, user interface 500 of FIG. 5 may present an online event that a user is accessing along with one or more additional online participants. In some embodiments, step 1302 of FIG. 13 may be substantially similar to step 1102 of FIG. 11, and the previous description may apply.

At step 1304, an option to capture a first image may be received by a server hosting the online event displayed within the user interface. For example, a user may press image capture button 520 of FIG. 5, and a signal may be sent to server 110 to capture an image. In some embodiments, the option to capture a first image may be received by the user device presenting the online event. For example, the user device may receive the signal from the user interface and open an image capturing application resident on the user device. In some embodiments, step 1304 may be substantially similar to step 1104 of FIG. 11, and the previous description may apply.

At step 1306, the first image may be captured. For example, a first image of the online event presented within the user interface may be captured. In some embodiments, step 1306 may be substantially similar to step 1106 of FIG. 11, and the previous description may apply.

At step 1308, the captured first image may be added to the online event. For example, if the user captures an image using an image capturing component on their user device, the captured image may be added to the presented online event. In this particular scenario, the added image may be placed within a content window, such as content window 504. However, persons of ordinary skill in the art will recognize that any image may be added at any particular location within the online event presented within the user interface, and adding the captured image to the content window is merely exemplary.

In some embodiments, the captured first image may be added to a listing of backgrounds capable of being used within the presented online event. For example, the user may capture an image of a particular logo, and may add that to the list of background options by pressing option 660*d* of FIG. 6. This may allow the user to customize their images with backgrounds of their choosing.

At step 1310, a second image may be created that includes the added first image. For example, after the image has been captured and added to the content window, an image of the online event including the added first image may be created. In this particular scenario, creation of the second image may correspond to a new image capture of the online event displayed within the user interface. In some embodiments, creating the second image may occur in response to the user pressing the image capture button a second time. For example, the user may press capture button 520 of FIG. 5 after the first captured image has been added to the online event in order to capture a second image included the first captured image displayed within the online event.

At step 1312, the second image may be displayed within a pop-up window presented on the user interface. For example, pop-up window 640 may include user interface portion 650. User interface portion 650 may, in some embodiments, include content window portion 654, which may further include the added first image displayed therein. The pop-up window may allow the user to perform any number of steps including, but not limited to, modifying a background of the online event including the added first image and/or sharing the created second image.

Figure 14:
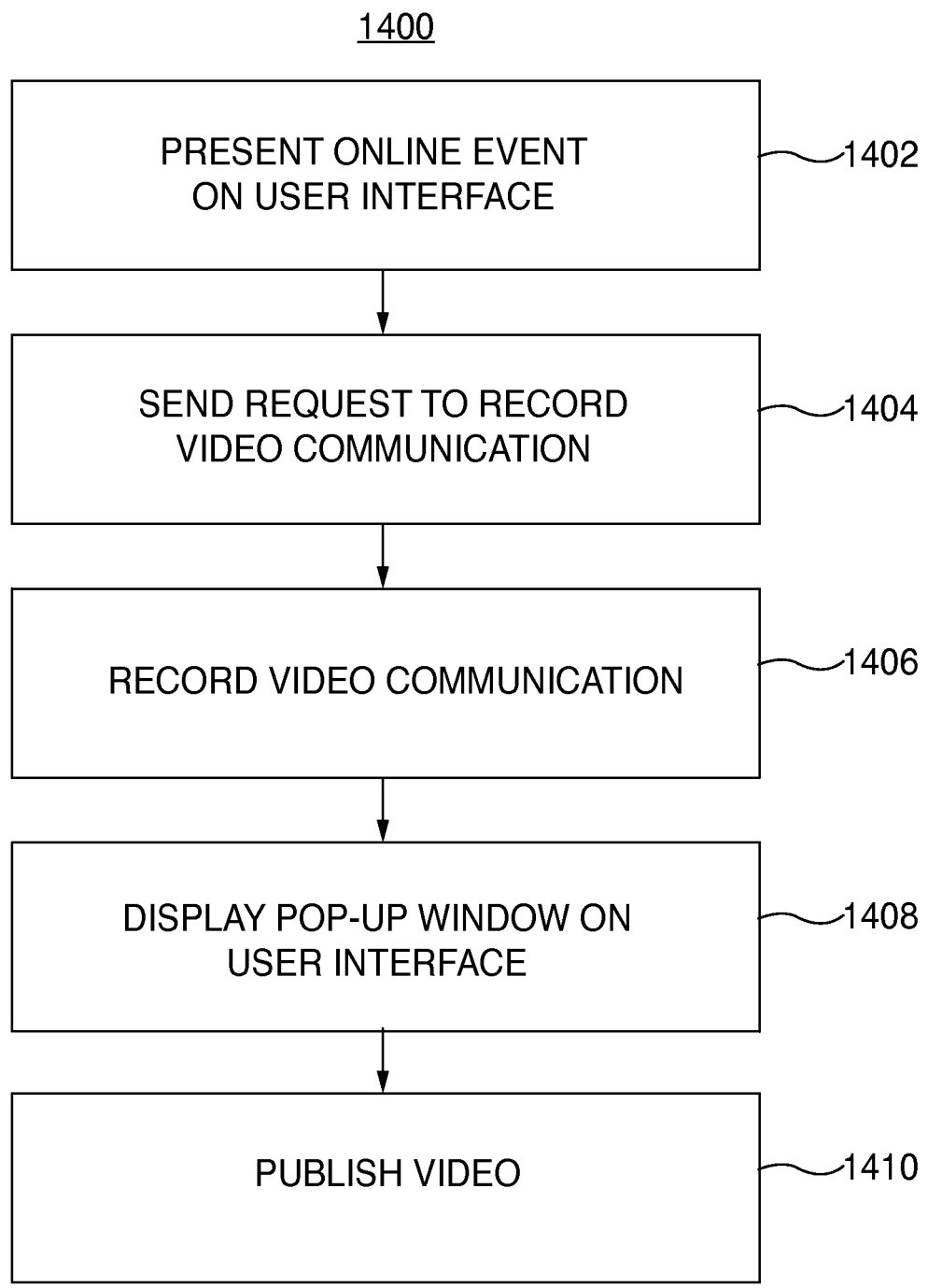
FIG. 14 is a flowchart of an illustrative process for publishing recorded video in accordance with various embodiments.

FIG. 14 is a flowchart of an illustrative process for publishing recorded video in accordance with various embodiments. Process 1400 may begin at step 1402. At step 1402, an online event may be presented on a user interface of a user device. For example, an online event, such as an online class, may be presented on user interface 500 of FIG. 5. In some embodiments, step 1402 may be substantially similar to step 1102 of FIG. 11, and the previous description may apply.

At step 1404, a user may send a request to an online participant of the event asking for permission to record video communications between the user and the online participant. For example, a user accessing an online event displayed within user interface 1000 may receive request 1008. The request may ask whether the user will allow a video communication that will occur between the user and another online participant of the event (e.g., USER 1), to be recorded. In some embodiments, the request may also be used to initiate a video chat with the requesting participant.

As an illustrative example, a user of a user device (e.g., user device 121 of FIG. 1) may send a request to another online participant of the online event. The online participant receiving the request may be presented with options 1010 and 1012, which may allow the online participant to respectively accept or decline the request to record the video communication. If the online participant selects option 1010, video communications that subsequently may occur between the user and the online participant may be recorded and stored on the user device and/or on the server. If, however, the online participant declines the request, then no video communications between the user and the online participant may occur.

In some embodiments, the request to record video communications may be sent to the server. For example, a user may select record option 920 of FIG. 9, which may send a request to the server to allow the user to record video and/or audio communications that may occur during the online event being presented on their user interface. In response to receiving the request, the server and/or a host or administrator of the online event may determine whether the user may be allowed access to recording features for the online event. For example, if the online event corresponds to a copyrighted broadcast, then the server may decline the request to allow video recording. However, persons of ordinary skill in the art will recognize that in some embodiments no request may need to be sent to allow video communications to occur, and video communications may automatically be capable of being recorded for certain types of online events.

At step 1406, the video communications may be recorded upon the sent request being approved. For example, after an online participant selects option 1010 of FIG. 10, the video communications may begin to be recorded. In some embodiments, the recordings may be stored on the user device. However, in some embodiments, the recording may be recorded instead, or additionally, on the server.

At step 1408, a pop-up window may be displayed on the user interface presenting the online event. The recorded video communication may also be displayed within the pop-up window. For example, pop-up window 940 may include user interface portion 950, which may be recorded. In this particular scenario, recording indicator 958 may be displayed within the pop-up window, which may indicate to the user that the presented online event and/or video communications from within the presented online event are currently being recorded. Recording indicator 958 may also, in some embodiments, indicate an amount of time that the recording occurs for. For example, as the recording progresses, a timer may be displayed within recording indicator 958 that signifies an amount of time that the video communication has been recorded.

At step 1410, the recorded video displayed within the pop-up window may be published or shared with one or more contacts of the user and/or using one or more social media networks. For example, after the user has recorded video for a certain amount of time, the user may select one or more of sharing options 970*a-c* of FIG. 9 to share or publish the recorded video. In some embodiments, prior to publishing the recorded video, the user may have to stop the recording process by pressing record button 920 again. This may allow the video to be stored first in memory on the user device and/or the server so that after it has been published, the user may still have access to the video.

In some embodiments, the user may be capable of modifying a background of the recorded video by selecting a new background. For example, the user may select to insert a logo or brand name in the background. In this particular example, the user may select a background option from one of a plurality of background options that may also be presented within the pop-up window. For example, pop-up window 940 may also include background options 960*a-c*, which may allow the user to modify the current background of the video to instead include that of the selected background option.

In some embodiments, the user may decide to publish the recorded video on a social media network. For example, the user may select sharing option 970*a* which may correspond to "SOCIAL MEDIA NETWORK 1". However, in some embodiments, SOCIAL MEDIA NETWORK 1 may have a limit on a size of a video that may be published thereon. Thus, the user may be prompted prior to publishing to edit the video to reduce either the quality and/or the duration of the video as to conform with the requirements of the particular publishing platform. Persons of ordinary skill in the art will also recognize that although only three sharing options 970*a-c* are displayed within pop-up window 940, any number of additional sharing options or publishing mechanisms may be displayed and/or used, and the use of two social media networks and an email as publishing means are merely exemplary.

FIG. 15 is a flowchart of an illustrative process for publishing transcribed audio communications in accordance with various embodiments. Process 1500 may begin at step 1502. At step 1502, an online event may be presented within a user interface displayed on a user device. For example, user interface 500 of FIG. 5 may present an online event accessed by one or more online participants, such as an online class. In some embodiments, step 1502 may be substantially similar to step 1102 of FIG. 11, and the previous description may apply.

At step 1504, audio communications from the online event may be captured. In some embodiments, the user device presenting the online event on the user interface may capture the audio communications, however, the audio communications may also be captured separately and/or in parallel by the server hosting the online event. In some embodiments, capturing the audio may also include recording the audio communications. For example, as the audio communications are captured, they may be recorded and stored on the user device and/or the server hosting the online event.

In some embodiments, the audio communications may correspond to the general audio communications of the online event. For example, the online event may include a presenter presenting materials and one or more online participants communicating with one another and/or the presenter. In this particular scenario, each one of the audio communications may be captured. In some embodiments, the captured audio communications may correspond to a private chat occurring within the online event between one or more online participants, and the captured audio may exclude other audio not originating from within the chat. For example, two or more online participants may form a group within the online event, and the audio communications between the two online participants may be captured. In some embodiments, only the audio generated by the online event itself may be captured. For example, if the online event corresponds to a musical performance, only the music originating from the online event may be captured, and any group communications that occur within the online event may not be captured. However, persons of ordinary skill in the art will recognize that any type of audio communication that may occur within the online event may be captured, and the aforementioned situations are merely exemplary.

At step 1506, the captured audio communications may be transcribed. For example, as the audio communications are captured, they may be filtered into one or more audio-to-text programs, which may allow the audio communications to be transcribed into contextual communications. In some embodiments, the audio-to-text programs may correspond to one or more voice recognition and/or word recognition algorithms. The algorithms may further be located on the user device and/or on the server itself. In some embodiments, after the audio communications have been captured, they may be sent to the server to be transcribed, and then sent back to the user device after the transcribing has completed. Persons of ordinary skill in the art will recognize that any known method or process for transcribing audio communications into textual communications may be used. In some embodiments, the audio-to-text programs may be dynamic and may be capable of learning inflections, phrases, and colloquialisms over time to provide accurate and precise transcriptions. In some embodiments, the transcribed communications may be reviewed by the user to correct any phrases that were not initially processed or capable of being analyzed by the audio-to-text programs. This may also aid in helping the program to learn how particular words are associated particular sounds.

At step 1508, a pop-up window may be displayed on the user interface displaying the online event. In some embodiments, the transcribed audio communications may be displayed within the pop-up window. For example, pop-up window 640 of FIG. 6 may include user interface portion 650 which may include the transcribed audio communications. The transcribed audio communications may be displayed within the pop-up window in any suitable manner. For example the transcribed audio communications may take up substantially all of the user interface portion of the pop-up window or only a select portion of the content window portion. In some embodiments, step 1508 may be substantially similar to step 1108 of FIG. 11, and the previous description may apply.

At step 1510, the transcribed audio communications may be published using one or more sharing options provided within the pop-up window. For example, a user may select one of sharing options 670a-c to publish the transcribed audio. This may allow the user to share the captured audio communications with a number of different individuals in an easy format. For example the transcribed audio communications may be a smaller file than the actual audio communications file, therefore it may be easier/quicker to share or publish using the one or more sharing options.

The various embodiments described herein may be implemented using a variety of means including, but not limited to, software, hardware, and/or a combination of software and hardware. The embodiments may also be embodied as computer readable code on a computer readable medium. The computer readable medium may be any data storage device that is capable of storing data that can be read by a computer system. Various types of computer readable media include, but are not limited to, read-only memory, random-access memory, CD-ROMs, DVDs, magnetic tape, or optical data storage devices, or any other type of medium, or any combination thereof. The computer readable medium may be distributed over network-coupled computer systems. Furthermore, the above described embodiments are presented for the purposes of illustration are not to be construed as limitations.

What is claimed is:

1. A method for publishing images from an online event, the method comprising:
presenting, on a user interface, a live online event comprising a plurality of online participants accessing the online event in real-time through a plurality of user devices;
providing an opportunity to make a selection to capture a first image from the presented online event;
receiving the selection to capture the first image;
capturing, in response to receiving the selection, the first image, the first image having a background; and
displaying, in response to capturing, a first pop-up window within the presented online event on the user interface, wherein the first pop-up window comprises:
the first image, wherein the first image is a screenshot of the online event;
at least one sharing option; and
at least one background option for at least one of adding, deleting, and modifying the background.

2. The method of claim 1, wherein:
the opportunity is presented within the user interface.

3. The method of claim 1, wherein the opportunity is a button.

4. The method of claim 3, wherein the opportunity comprises a button, capturing further comprises:
pressing the button located on the user interface to capture the first image.

5. The method of claim 1, wherein the online event comprises at least one of a class, a conference, a lecture, a concert, and a performance.

6. The method of claim 1, wherein the first image comprises:
a screen shot of a conversation between a user accessing the online event and at least one additional online participant accessing the event.

7. The method of claim 1, further comprising:
sharing the first image with at least one additional online participant accessing the online event using the at least one sharing option.

8. The method of claim 7, wherein the at least one sharing option enables the first image to be shared via at least one of: an email, an SMS message, an instant message, a social media post, and a post to the online event.

9. The method of claim 1, wherein the at least one background option comprises adding at least one of: a logo, a picture, a video, and a user uploaded image.

10. A non-transitory computer readable medium containing instructions that, when executed by at least one processor of a device, cause the device to:
   present, on a user interface, a live online event comprising a plurality of online participants accessing the online event in real-time through a plurality of user devices;
   provide a first opportunity to make a first selection to capture a first image from the online event;
   receive the first selection to capture the first image;
   capture, in response to receiving the first selection, the first image , the first image having a background;
   present a first pop-up window comprising the captured first image and a second opportunity to make a second selection of at least one background option;
   receive the second selection; and
   create, in response to receiving the second selection, a second image, wherein the second image comprises the first image having the background at least one of added, deleted, and modified based on the selected background option.

11. The non-transitory computer readable medium of claim 10, when executed by the at least one processor, further causes the device to:
   display the created second image on the user interface.

12. The non-transitory computer readable medium of claim 10, wherein the second image is displayed within at least one of:
   an updated version of the first pop-up window; and
   a second pop-up window.

13. The non-transitory computer readable medium of claim 12, wherein the second pop-up window comprises at least one sharing option.

14. The non-transitory computer readable medium of claim 10, wherein:
   the first selection determines a type of image the captured first image will be; and
   the type of image comprises one of: a screen shot of the online event, a screen shot of a conversation within the online event, and an image of a portion of the online event.

15. The non-transitory computer readable medium of claim 10, wherein:
   the at least one background option comprises a plurality of backgrounds; and
   each background option of the plurality of background images modifies the background of the captured first image.

16. The non-transitory computer readable medium of claim 15, wherein the plurality of backgrounds comprises at least one of:
   the online event;
   an image selected from a user device;
   an image selected from a social media network account;
   a logo corresponding; and
   a brand insignia.

17. The non-transitory computer readable medium of claim 10, wherein:
   second image is displayed within a second pop-up window; and
   the second pop-up window comprises an additional option to change a background of the second image.

18. The non-transitory computer readable medium of claim 17, when executed by the at least one processor of the device, further causes the device to:
   select the additional option corresponding to a new background;
   remove the background of the second image; and
   replace the background of the second image with the new background based on the selected additional option.

19. A method for adding images to a live online event comprising a plurality of online participants accessing the online event in real-time through a plurality of user devices, comprising:
   presenting an online event accessed by a plurality of online participants within a user interface;
   capturing a first image using an image capturing component of a user device;
   adding the captured first image to the online event;
   capturing a second image of the user interface using the image capturing component of the user device, the user interface comprising the presented online event and the captured first image; and
   displaying, on the user interface, the second image within a pop-up window, the second image having a background, wherein the pop-up window further comprises:
      at least one sharing option; and
      at least one background option for at least one of adding, deleting, and modifying a background.

20. The method of claim 19, further comprising:
   receiving a user selection to capture the first image prior to the capturing.

21. The method of claim 19, further comprising:
   receiving a first user selection of at least one of the at least one sharing options; and
   receiving a second user selection of a first background option of the at least one background options.

22. The method of claim 21, further comprising:
   modifying a background of the second image to include the selected first background option;
   creating a third image comprising the second image having the modified background; and
   publishing the third image using the selected at least one sharing option.

23. The method of claim 19, wherein adding further comprises:
   placing the captured first image within a predetermined portion of the online event.

* * * * *